US012297684B1

(12) United States Patent
Campbell et al.

(10) Patent No.: US 12,297,684 B1
(45) Date of Patent: May 13, 2025

(54) WINDOW OPERATOR

(71) Applicant: QuB LLC, Lake Elmo, MN (US)

(72) Inventors: Frank W. Campbell, Tucson, AZ (US); John J. Micinski, Belvidere, IL (US)

(73) Assignee: QuB LLC, Lake Elmo, MN (US)

( * ) Notice: Subject to any disclaimer, the term of this patent is extended or adjusted under 35 U.S.C. 154(b) by 420 days.

(21) Appl. No.: 16/799,269

(22) Filed: Feb. 24, 2020

Related U.S. Application Data

(60) Provisional application No. 62/809,798, filed on Feb. 25, 2019.

(51) Int. Cl.
*E05F 15/622* (2015.01)

(52) U.S. Cl.
CPC ....... *E05F 15/622* (2015.01); *E05Y 2201/434* (2013.01); *E05Y 2201/70* (2013.01); *E05Y 2201/702* (2013.01); *E05Y 2900/148* (2013.01)

(58) Field of Classification Search
CPC ........ E05F 15/622; E05F 15/611; E05F 15/60
USPC ........................... 49/340, 346, 344, 176, 177
See application file for complete search history.

(56) References Cited

U.S. PATENT DOCUMENTS

| | | | | | |
|---|---|---|---|---|---|
| 2,366,613 | A | | 1/1945 | Hagstrom | |
| 2,719,036 | A | * | 9/1955 | Brundage | E05F 15/622 49/140 |
| 3,494,219 | A | * | 2/1970 | Hillhouse | E05D 15/40 49/248 |
| 4,497,135 | A | * | 2/1985 | Vetter | E05D 15/30 49/252 |
| 4,934,203 | A | * | 6/1990 | Bailey | E05F 15/622 49/340 |
| 6,314,681 | B1 | * | 11/2001 | Moody | E05F 11/34 49/346 |
| 6,516,567 | B1 | * | 2/2003 | Stone | E05F 15/622 49/343 |
| 6,915,608 | B2 | | 7/2005 | Labarre | |
| 8,365,470 | B1 | * | 2/2013 | Campbell | E05F 11/34 49/246 |
| 8,434,265 | B1 | * | 5/2013 | Campbell | E05D 15/30 49/260 |
| 9,689,190 | B2 | | 6/2017 | Wu | |
| 10,221,607 | B2 | | 3/2019 | Gramstad | |
| 10,760,317 | B2 | | 9/2020 | Guelck | |
| 11,719,037 | B2 | | 8/2023 | Farnes et al. | |

(Continued)

FOREIGN PATENT DOCUMENTS

| | | | |
|---|---|---|---|
| CN | 108019113 | * | 5/2018 |
| CN | 113464024 | * | 10/2021 |
| GB | 190904670 A | | 7/1909 |

*Primary Examiner* — Gregory J Strimbu
(74) *Attorney, Agent, or Firm* — Dicke, Billig & Czaja, PLLC

(57) ABSTRACT

A window operator assembly comprises a leadscrew and an elongated nut. The leadscrew is pivotally connected to a window frame via a frame pivot and is rotatable relative to the window frame. The elongated nut is pivotally connected to a window sash via a sash pivot. As the leadscrew rotates in a first direction, the elongated nut moves in a first direction along the leadscrew and moves the window sash toward an open position relative to the window frame. As the leadscrew rotates in a second direction, the elongated nut moves in a second direction along the leadscrew and moves the window sash toward a closed position relative to the window frame.

19 Claims, 22 Drawing Sheets

(56) References Cited

U.S. PATENT DOCUMENTS

| | | | | |
|---|---|---|---|---|
| 2007/0261306 | A1* | 11/2007 | Hanna | E05F 15/622<br>49/52 |
| 2009/0200830 | A1* | 8/2009 | Paton | E05F 15/622<br>296/146.8 |
| 2010/0270814 | A1 | 10/2010 | Labarre | |
| 2013/0186220 | A1* | 7/2013 | Kummer | F16H 25/2003<br>74/89.42 |
| 2014/0324251 | A1* | 10/2014 | Hansen | E05F 15/63<br>296/57.1 |
| 2017/0191553 | A1* | 7/2017 | Heiberger | F16H 25/2418 |
| 2019/0003236 | A1 | 1/2019 | Hall et al. | |
| 2019/0211605 | A1* | 7/2019 | Scheuring | E05F 15/70 |
| 2020/0408022 | A1* | 12/2020 | Elder | E05F 15/54 |
| 2021/0230923 | A1* | 7/2021 | Yokozawa | H02P 6/08 |
| 2021/0270075 | A1* | 9/2021 | Sakiyama | F16H 25/20 |
| 2021/0355735 | A1* | 11/2021 | Hagemann | E05F 15/622 |

* cited by examiner

WINDOW OPERATOR

CROSS-REFERENCE TO RELATED APPLICATIONS

This application claims the benefit of U.S. Provisional Application Ser. No. 62/809,798, filed Feb. 25, 2019, which is incorporated in its entirety herein by reference.

BACKGROUND

This invention relates generally to a window operator and, more particularly, to a window operator that utilizes an elongate member to move between an open position and a closed position.

Most modern casement window operating assemblies utilize a rotary actuator that may be used to open or close a window sash. The actuator is typically in the form of a hand crank adapted to be turned in one direction to open the sash and in an opposition direction to close the sash. There are also instances where the actuator is operable by an electric motor.

There have been many types of actuators that have been utilized in the past. However, there has always been room for improvement and changes over the existing window operating assemblies.

For the reasons stated above and for other reasons stated below, which will become apparent to those skilled in the art upon reading and understanding the present specification, there is a need in the art for an improved window operating system.

SUMMARY

The above-mentioned problems associated with prior devices are addressed by embodiments of the disclosure and will be understood by reading and understanding the present specification. The following summary is made by way of example and not by way of limitation. It is merely provided to aid in understanding some of the aspects of the invention.

In one embodiment, a window operator assembly moves a window sash between an open position and a closed position relative to a window frame. The window sash has a top sash member operatively connected to a bottom sash member by a first side sash member and a second side sash member. The window frame has a top frame member operatively connected to a bottom frame member by a first side frame member and a second side frame member. The window operator assembly comprises a leadscrew and an elongated nut. The leadscrew is pivotally connected to the window frame via a frame pivot and is rotatable relative to the window frame. The elongated nut is pivotally connected to the window sash via a sash pivot. As the leadscrew rotates in a first direction, the elongated nut moves in a first direction along the leadscrew and moves the window sash toward an open position relative to the window frame. As the leadscrew rotates in a second direction, the elongated nut moves in a second direction along the leadscrew and moves the window sash toward a closed position relative to the window frame.

In one embodiment, a window operator assembly moves a window sash between an open position and a closed position relative to a window frame. The window sash has a top sash member operatively connected to a bottom sash member by a first side sash member and a second side sash member. The window frame has a top frame member operatively connected to a bottom frame member by a first side frame member and a second side frame member. The window operator assembly comprises a leadscrew, a motor, a first pivot, an elongated nut, and a second pivot. The leadscrew has a first leadscrew end and a second leadscrew end. The motor is operatively connected to the first leadscrew end and is configured and arranged to rotate the leadscrew. The first pivot is configured and arranged to pivot at least one of the leadscrew and the motor relative to the frame. The elongated nut has a first nut end, a second nut end, and a bore extending longitudinally through the elongated nut. The bore is configured and arranged to receive at least a portion of the leadscrew, and the elongated nut is configured and arranged to move along the leadscrew when the leadscrew is rotated by the motor. The second pivot is configured and arranged to pivot the elongated nut relative to the sash.

In one embodiment, an operator moves a first member between a first position and a second position relative to a second member. The operator comprises a leadscrew, a rotating member, a first pivot, an elongated nut, and a second pivot. The leadscrew has a first leadscrew end and a second leadscrew end. The rotating member is operatively connected to the first leadscrew end and is configured and arranged to rotate the leadscrew. The first pivot is configured and arranged to pivot at least one of the leadscrew and the rotating member relative to the second member. The elongated nut has a first nut end, a second nut end, and a bore extending longitudinally through the elongated nut. The bore is configured and arranged to receive at least a portion of the leadscrew, and the elongated nut is configured and arranged to move along the leadscrew when the leadscrew is rotated by the rotating member. The second pivot is configured and arranged to pivot the elongated nut relative to the first member.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

DETAILED DESCRIPTION

Figure 1:
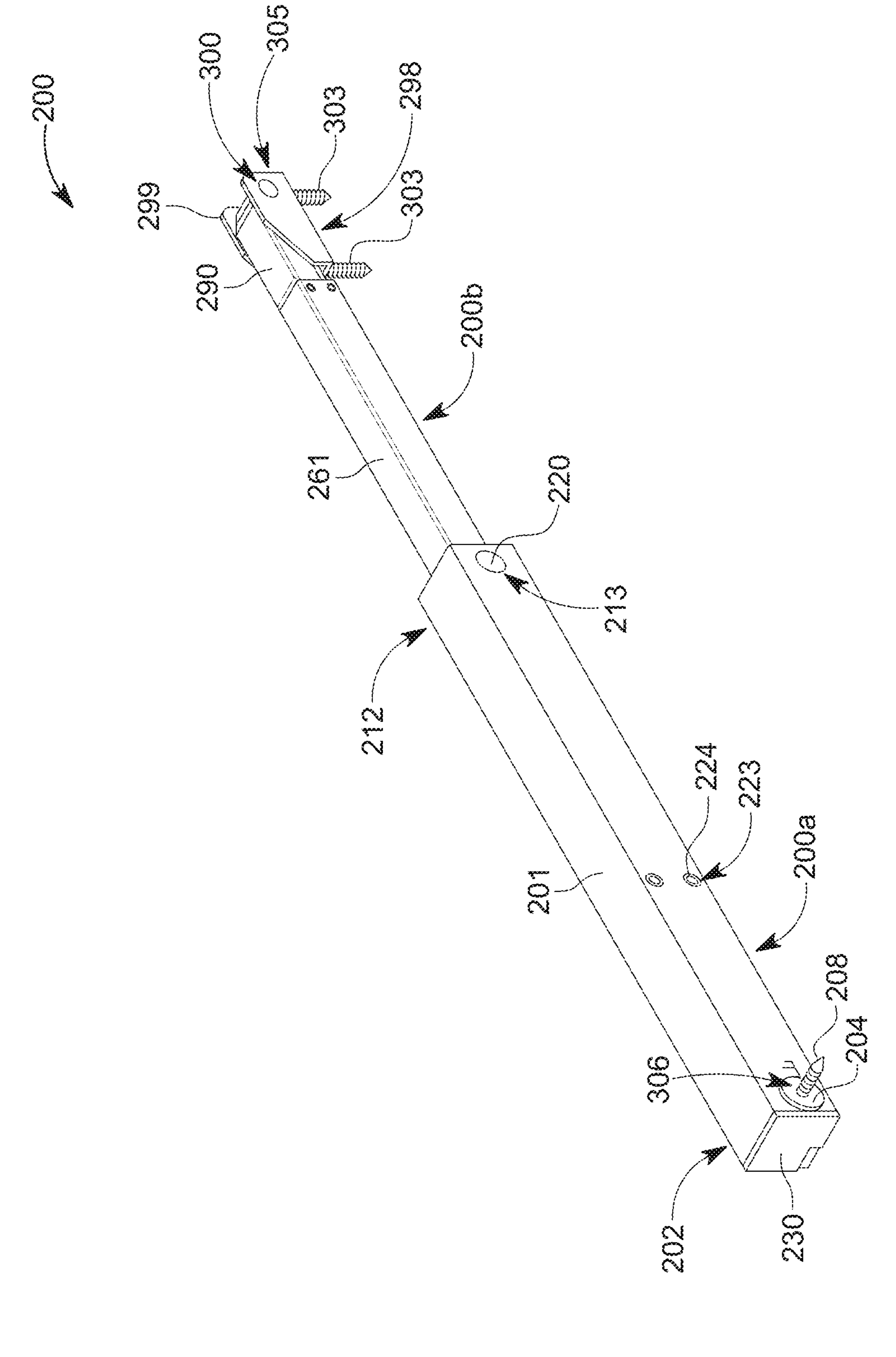
FIG. 1 is a perspective view of an embodiment window operator connected to a window and constructed in accordance with the principles of the present invention.
Figure 2:
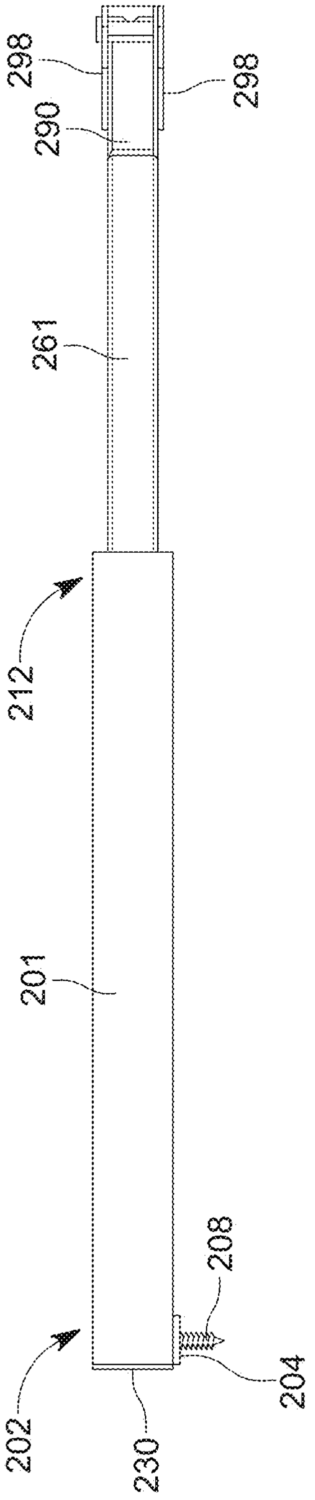
FIG. 2 is a top view of the window operator shown in FIG. 1.
Figure 3:
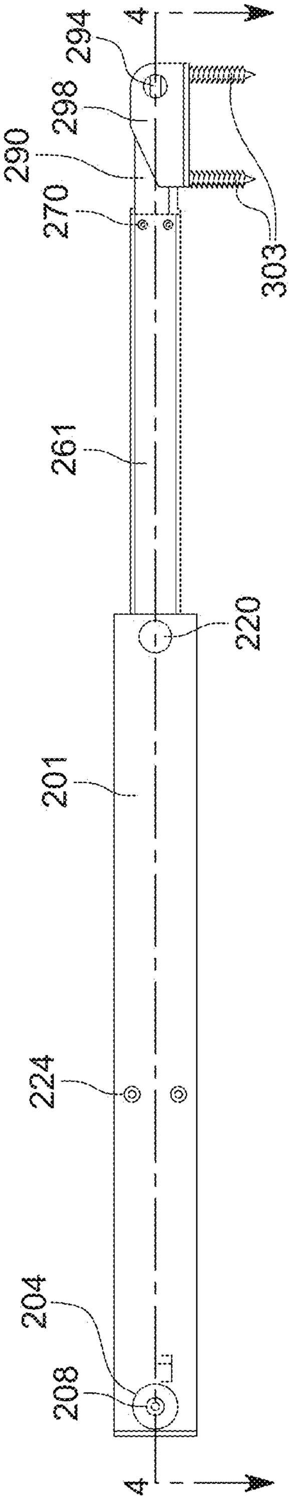
FIG. 3 is a side view of the window operator shown in FIG. 1.
Figure 4:
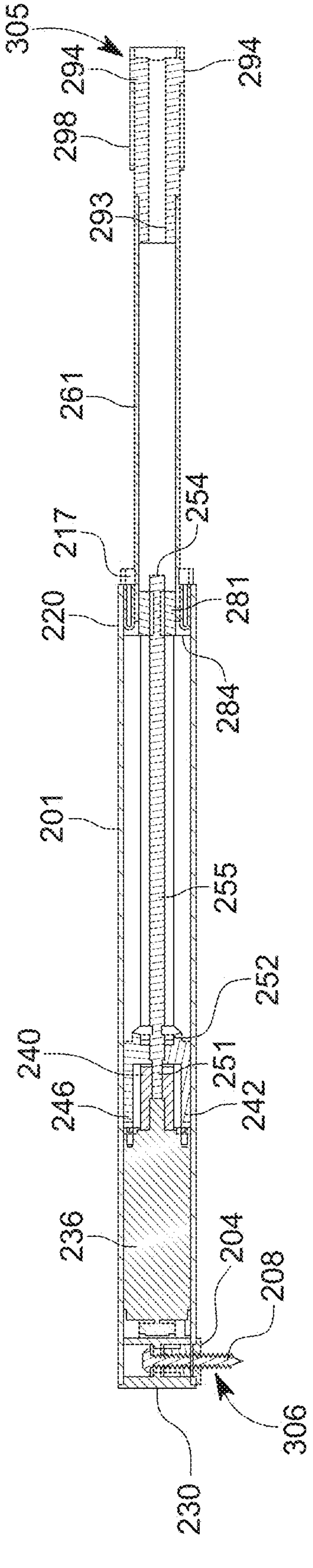
FIG. 4 is a cross-section view of the window operator shown in FIG. 1 taken along the lines 4-4 in FIG. 3.
Figure 4A:
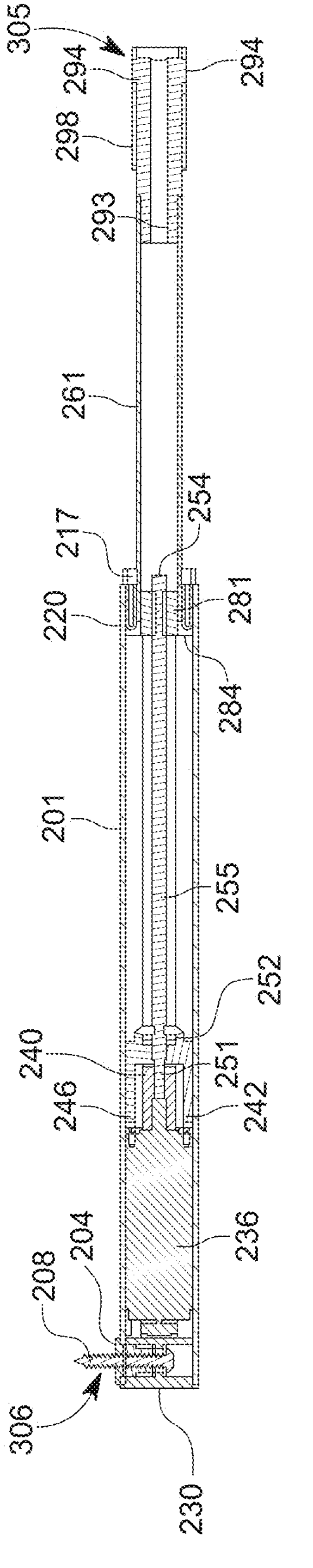
FIG. 4A is a cross-section view of the window operator with the fastener assembly extending in an opposite direction as that shown in FIG. 4.

In the following detailed description, reference is made to the accompanying drawings, which form a part hereof, and in which is shown by way of illustration embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that other embodiments may be utilized and mechanical changes may be made without departing from the spirit and scope of the present disclosure. The following detailed description is, therefore, not to be taken in a limiting sense.

Embodiments of the disclosure generally provide at least one window operator assembly interconnecting a window frame and a sash of a window. Although it is recognized that any suitable type of window may be used, and example window 100 includes a window frame 101 and a sash 107. The window frame 101 is formed by a top member (not shown) operatively connected to a bottom member 103 by a first side member 105 and a second side member 106. The sash 107 is formed by a top member 108 operatively connected to a bottom member 109 by a first side member 110 and a second side member 111. The sash 107 is operatively connected to the window frame 101 for relative movement between the open and closed positions. For example, the sash 107 may be moved in a controlled manner relative to the window frame 101 such that the sash 107 pivots, pivots and translates, pivots and slides, rotates, or otherwise moves relative to the window frame 101. Movement of the at least one operator assembly opens or closes the sash 107 relative to the window frame 101. A hinge 113 interconnects the frame 101 and the sash 107, and the hinge 113 controls the path of the sash 107 with respect to the frame 101, and the window operator assembly positions the sash 107 along the path by changing the distance between a sash pivot and a frame pivot.

Embodiments may eliminate the crank on a casement window and, optionally, components of the assembly may be hidden from view inside the casement window.

One or both of top and bottom operator assemblies may be used. For larger windows, using both the top operator assembly and the bottom operator assembly adds strength and stability to the system and makes it easier to open and close the sash. For smaller windows, an operator assembly may be positioned on either the top member (not shown) or the bottom member 103 of the window frame 101.

Embodiments may include at least one motor. There may be a motor proximate the top and/or the bottom of the window frame and there may be more than one motor proximate the top and/or the bottom of the window frame. The motor(s) may allow for operation of the assembly utilizing a variety of actuating sources such as, but not limited to, a wall switch, a remote control, a mobile phone app, a home security system, a HVAC system, and other types of home automation systems. If there is a loss of power to the system, there may be a manual override.

In one embodiment, illustrated in FIGS. 1-4, 7, and 8, a window operator assembly 200 includes an operator 200*a*, a leadscrew 250, and an elongated nut 200*b*, which pivotally interconnect a window frame 101 and a window sash 107.

Figure 5:
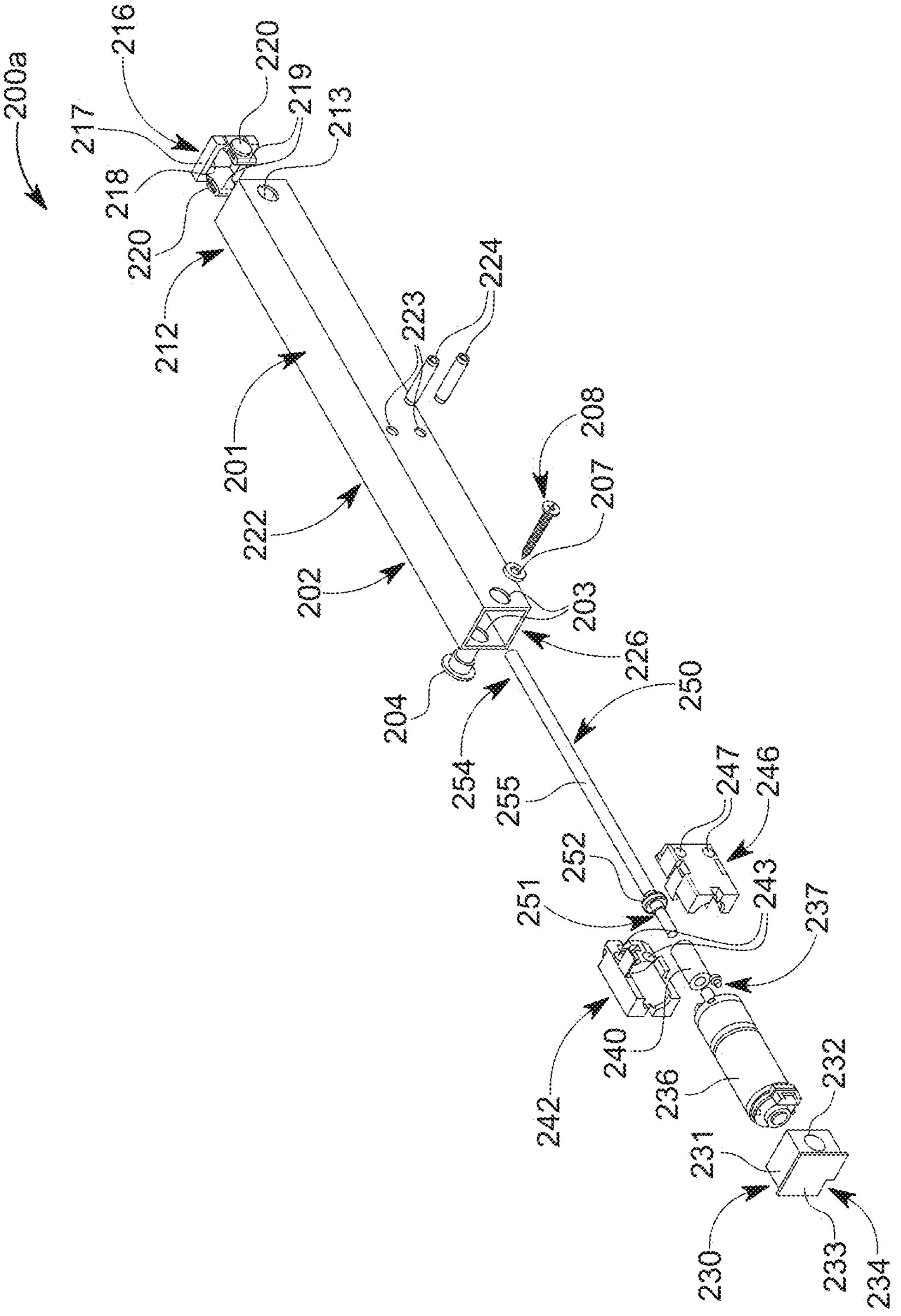
FIG. 5 is an exploded perspective view of a motor and housing assembly of the window operator shown in FIG. 1.

The operator 200*a* includes a housing 201. As illustrated in FIG. 5, the housing 201 is preferably generally tubular, for example a rectangular tube, with a bore 226 extending therethrough. In this embodiment, the housing 201 is configured and arranged to contain a motor 236 and at least a portion of the leadscrew 250 within the bore 226. The housing 201 includes a first end 202 including aligned apertures 203, a second end 212 including aligned apertures 213, and an intermediate portion 222 including aligned apertures 223 preferably on the same opposing sides of the housing 201.

The leadscrew 250 includes a first end 251 including a collar 252, a second end 254, and an intermediate portion 255. The collar 252 may comprise a snap ring between two washers.

A connector 240 interconnects the motor 236 and the first end 251 of the leadscrew 250, and first and second stabilizing members 242 and 246 support the collar 252 on the leadscrew 250, transferring the load from the collar 252 to the stabilizing members 242 and 246 rather than to the motor 236. The stabilizing members 242 and 246 also contact the fasteners 237 secured to the motor 236 to prevent the motor from rotating. Preferably, the stabilizing member 242 and 246 snap-fit or friction-fit together and include aligning bores 243 and 247. When these components are positioned within the housing 201, the bores 243 and 247 align with the apertures 223 of the housing 201 and pins 224 extend therethrough to connect the stabilizing members 242 and 246 to the housing 201. Although this embodiment utilizes a motor as a rotating member for the leadscrew 250, it is recognized that any suitable rotating mechanism, for example a crank, may be used to rotate the leadscrew 250.

A first end cap 230 is configured and arranged to close off the first end 202 of the housing 201 and preferably does not contact the motor 236, which allows the motor 236 to "float" within the housing 201 because the motor 236 is preferably only connected to the connector 240. The first end cap 230 includes a base 231 configured and arranged to fit within the bore 226 and through which a lateral bore 232 extends, and a flange 233 is connected to its distal end, acting like a stop against the housing 201. The flange 233 includes an optional notch 234, which allows for wiring (not shown) to reach the motor. The bore 232 aligns with the apertures 203, which are configured and arranged to receive a receiver 204. The receiver 204 is configured and arranged to receive a fastener 208 with an optional washer 207. The fastener 208 extends through the receiver 204 for connecting to the window frame 101. The receiver 204 not only connects the first end cap 230 to the housing 201 but also provides a frame pivot 306 for the housing 201 when the fastener 208 is secured to the window frame 101.

A second end cap or grommet 216 is configured and arranged to close off the second end 212 of the housing 201 and support the elongated nut 200*b* for additional columnar strength. The second end cap 216 includes a base 217 configured and arranged to fit within the bore 226 and through which a longitudinal bore 218 extends, and flanges 219 extending outward from opposing sides of the base 217. The flanges 219 include protrusions 220 configured and arranged to extend through the apertures 213 when the second end cap 216 is inserted into the second end 212. The leadscrew 250 extends through the bore 218 proximate the second end 212 of the housing 201 so that the second end 254 may be connected to the elongated nut 200*b*.

Figure 6:
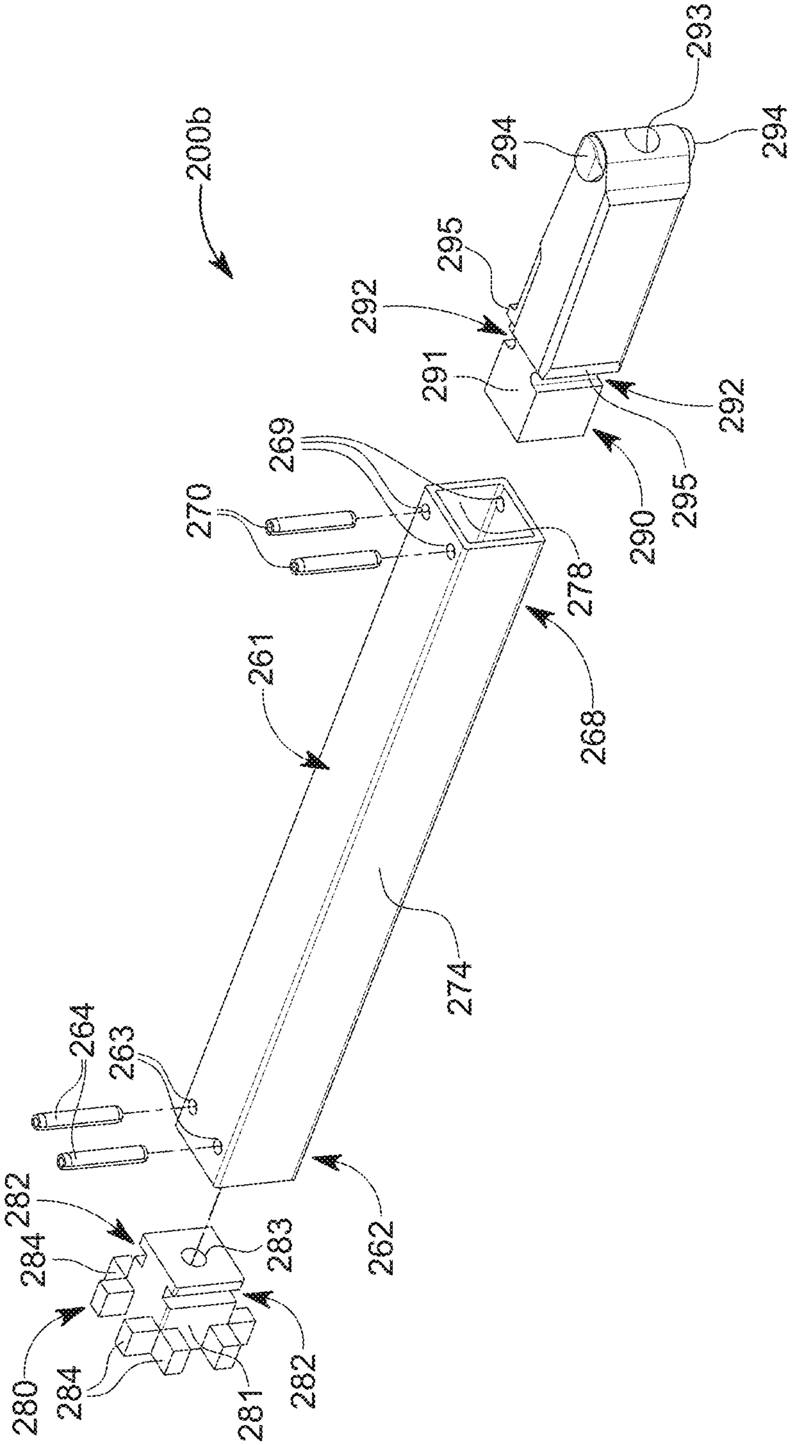
FIG. 6 is an exploded perspective view of an elongated nut assembly of the window operator shown in FIG. 1.

The elongated nut 200*b* includes a housing 261. As illustrated in FIG. 6, the housing 261 is preferably generally tubular, for example a rectangular tube, with a bore 278 extending therethrough. In this embodiment, the housing 201 is configured and arranged to receive at least a portion of the housing 261 within the bore 226. The housing 261 includes a first end 262 including aligned apertures 263, a second end 268 including aligned apertures 269, and an intermediate portion 274. The aligned apertures 263 and 269 are preferably on the same opposing sides of the housing 261. The rectangular tubes allow the housing 261 to slide relative to the housing 201 without rotating within the housing 201. Although this embodiment includes rectangular tubes, it is recognized that the housing 201 and the housing 261 may include mating features such as but not limited to corresponding shapes, mating channel and protrusion, or the like to prevent rotation of the housing 261 relative to the housing 201.

A first end cap 280 is configured and arranged to close off the first end 262 of the housing 261 and to threadably receive the second end 254 of the leadscrew 250. The first end cap 280 includes a base 281 configured and arranged to fit within the bore 278 and through which a longitudinal bore 283 extends. The longitudinal bore 283 is at least partially threaded to mate with the threads of the leadscrew 250. The proximal end of the base 281 includes slots 282 on opposing sides that correspond with the apertures 263 when the base 281 is inserted into the bore 278. Pins 264 extend through the apertures 263 and the slots 282 to connect the first end cap 280 to the housing 261. The distal end of the base 281 includes protrusions 284 extending outward, acting like a stop against the housing 261, being configured and arranged to contact the inner surface of the housing 201, and acting like a stop against base 217 when a portion of the housing 261 is inserted into the housing 201.

A second end cap 290 is configured and arranged to close off the second end 268 of the housing 261. The second end cap 290 includes a base 291 configured and arranged to fit within bore 278, and slots 292 align with apertures 269. Pins 270 extend through the apertures 269 and the slots 292 to connect the base 291 to the housing 261. Proximate the slots 292 the base 291 includes flanges 295 acting like a stop against the housing 261. A longitudinal bore 293 extends through the base 291. The distal end includes protrusions 294 on opposing sides.

The protrusions 294 of the base 291 extend through apertures 300 of a base 299 of a nut pivot bracket 298. The base 299 is generally U-shaped with three sides corresponding to three sides of the base 291. Because the protrusions 294 extend through apertures 300, the base 291 is able to pivot relative to the nut pivot bracket 298 by moving out of and into the opening into the cavity formed by the three sides of the base 299. Fasteners 303, shown in FIGS. 1 and 3, connect the nut pivot bracket 298 to the sash 109, and the protrusions 294 extending through the apertures 300 provide a sash pivot 305.

To install the window operator assembly 200, the receiver 204 and the fastener 208 may be positioned so that the fastener extends outward from either aperture 203 on either side of the housing 201 thereby allowing for installation with a sash that opens from either side of the window. This is a very beneficial feature because only one window operator assembly 200 is needed for right or left side opening windows, which simplifies manufacturing and reduces inventory requirements. The window operator assembly 200 may be used with casement windows, awning windows, double-hung windows, patio doors, and other suitable configurations.

Other advantages of this embodiment include a single pivot on the sash, which allows easy installation in the factory and universal (unhanded) fitment; and the frame pivot and the sash pivot positioned in line with the leadscrew, which allows for use of a smaller diameter leadscrew, producing greater linear force because the radius of the thread friction is smaller and causes less losses due to torque, resulting in greater linear forces for the same motor input torque and the actuator can be used on larger windows. This is beneficial because the trend in the industry is larger windows, especially for high end power operated installations. In addition, the motor is preferably disconnected from any loads that are not related to torque, which allows lower noise and longer motor life as the motor will self-center and reduce any possible side loads. The linear connection of the outer housing tube and the elongated nut allows higher column loads as the tubes take a greater portion of the column loads by keeping the leadscrew loads straight down the axis of the screw, its strongest direction. In this embodiment, the sash pivot 305 and the frame pivot 306 are preferably in line with the leadscrew 205 and the elongated nut housing bores 283 and 293.

Figure 7:
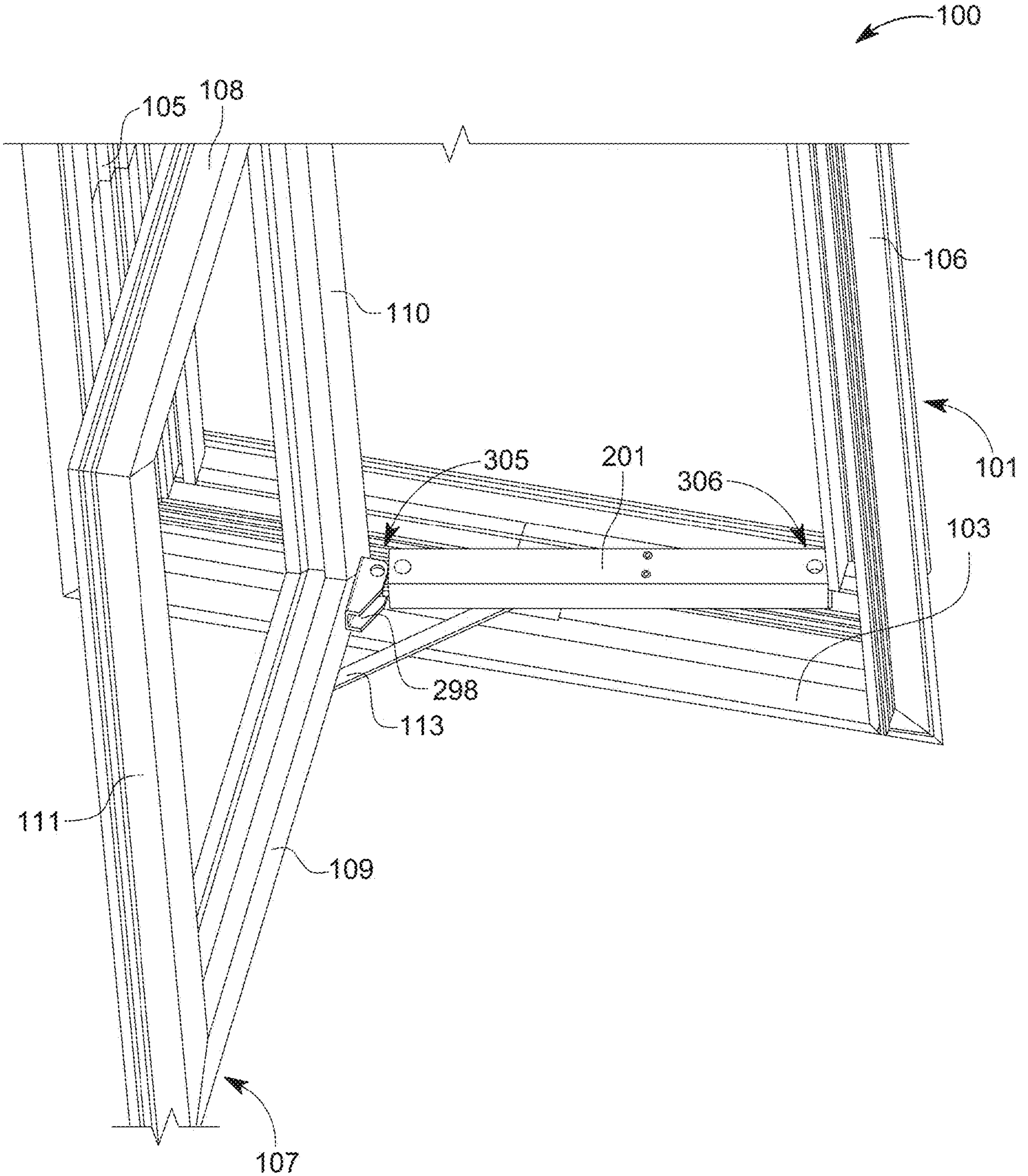
FIG. 7 is a perspective view of the window operator shown in FIG. 1 connected to a window assembly in a first open position.
Figure 8:
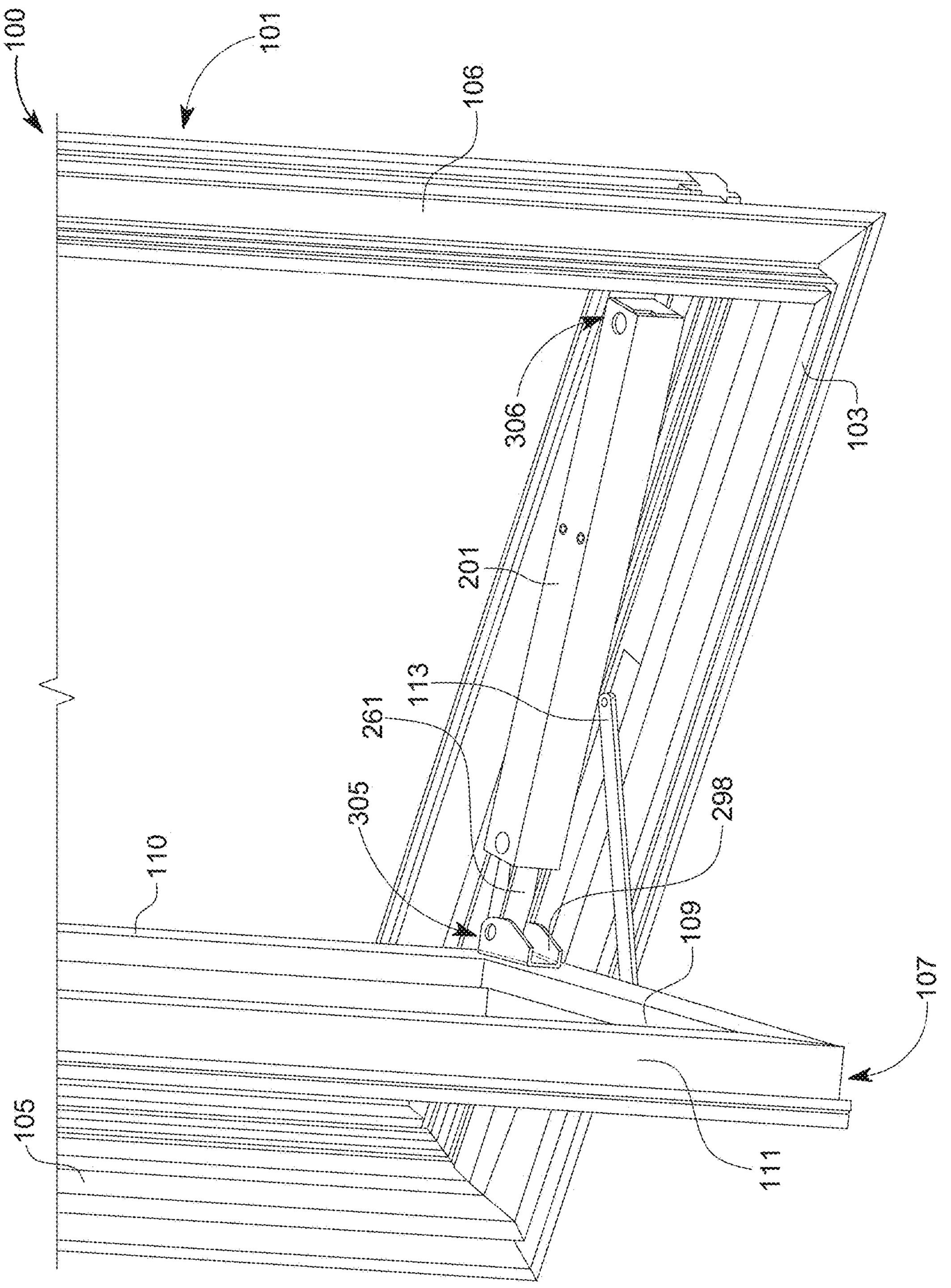
FIG. 8 is a perspective view of the window operator shown in FIG. 1 connected to a window assembly in a second open position.

In use, when the leadscrew 250 rotates, by a motor 236 or other rotating member, the elongated nut housing 261 moves along the leadscrew 250, causing the operator housing 201 to pivot about the frame pivot 306 and causing the elongated nut housing 261 to pivot about the sash pivot 305. The rotation of the leadscrew 250 without rotation of the elongated nut housing 261 causes the elongated nut housing 261 to move along the length of the leadscrew 250 and thus changes the distance between the sash pivot 305 and the frame pivot 306. In this way, the sash 107 moves position relative to the frame 101. As shown in FIGS. 7 and 8, as the elongated nut housing 261 moves further into the operator housing 201, the sash 107 opens more fully, and as the elongated nut housing 261 moves out of the operator housing 201, the sash 107 moves toward its closed position.

Another embodiment window operator assembly 400, illustrated in FIGS. 9-15, may be used with a window such as window 100. The hinge 113 controls the path of the sash 107 with respect to the frame 101, and the window operator assembly 400 positions the sash 107 along the path by changing the distance between a sash pivot 505 and a frame pivot 506. The window operator assembly 400 is similar to the window operator assembly 200 and, therefore, only the significant differences are being described. It is recognized that the differing components and features may be interchanged among the embodiments.

The window operator assembly 400 includes an operator **400*a* and an elongated nut 400*b*. The operator 400*a* includes a bracket assembly 401 interconnecting the motor 436 and the leadscrew 450 that allows the leadscrew 450 to rotate and pivot relative to the frame 101 at a frame pivot 506. The motor 436 is positioned within a housing 437 from which a pivot extension 438 including an aperture 439 extends. A portion of the motor 436 extends outward from the housing 437 proximate the pivot extension 438 to connect to the bracket assembly 401**.

Figure 13:
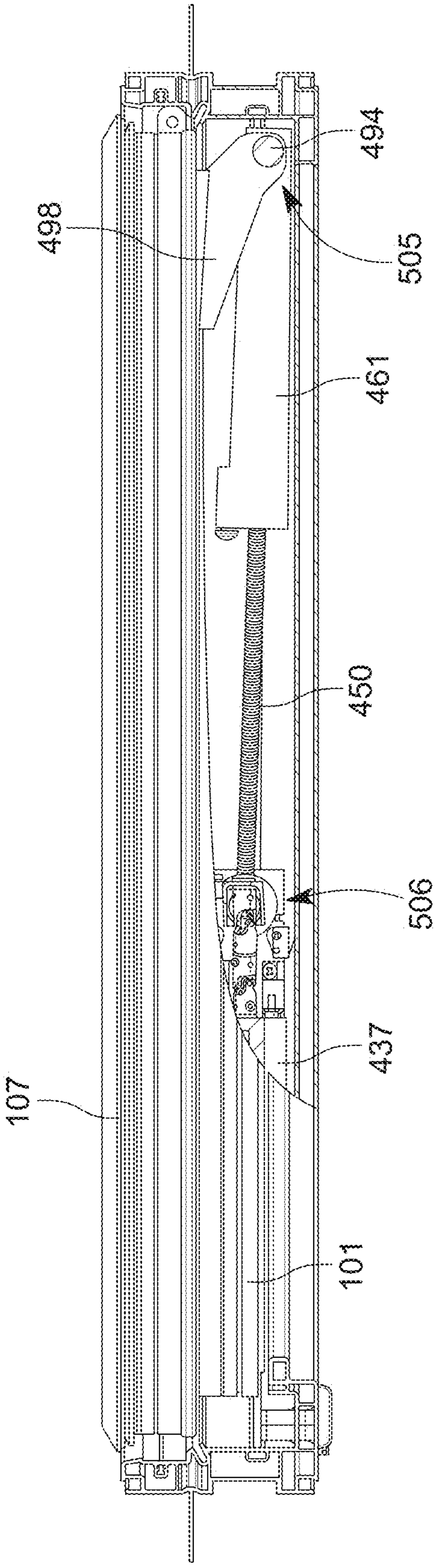
FIG. 13 is a top view of the window operator and window shown in FIG. 9 in a closed position with the window's top and side frame members removed and a portion of the bottom frame member removed.
Figure 14:
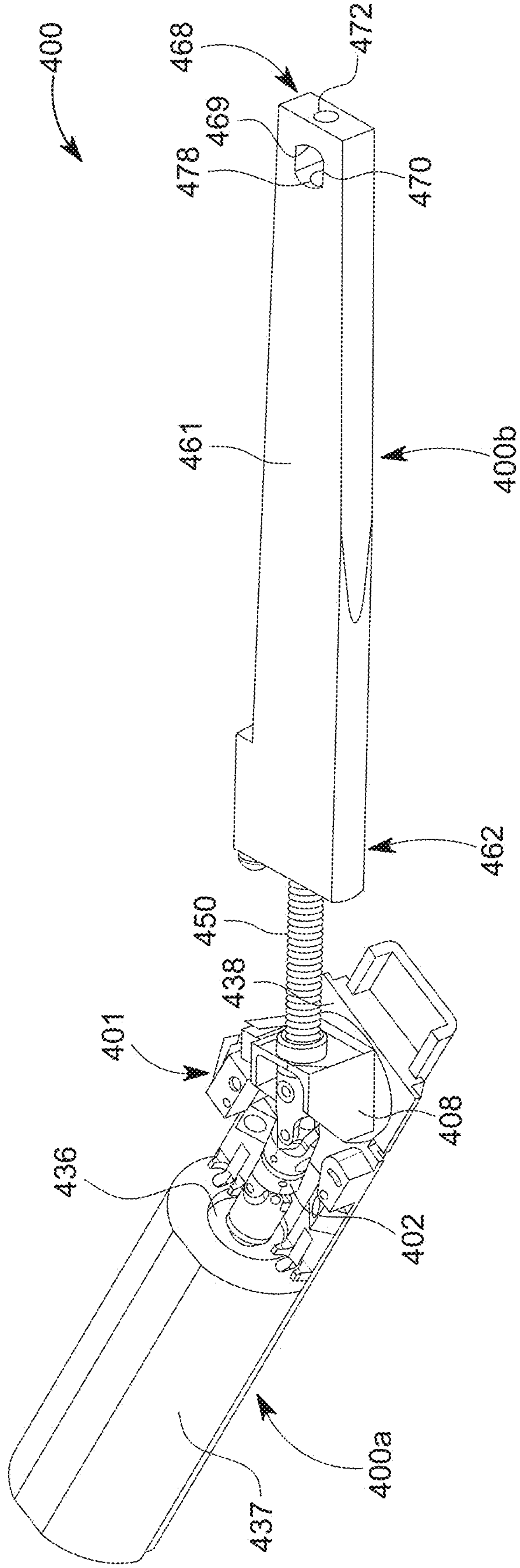
FIG. 14 is a perspective view of the window operator shown in FIG. 9.
Figure 15:
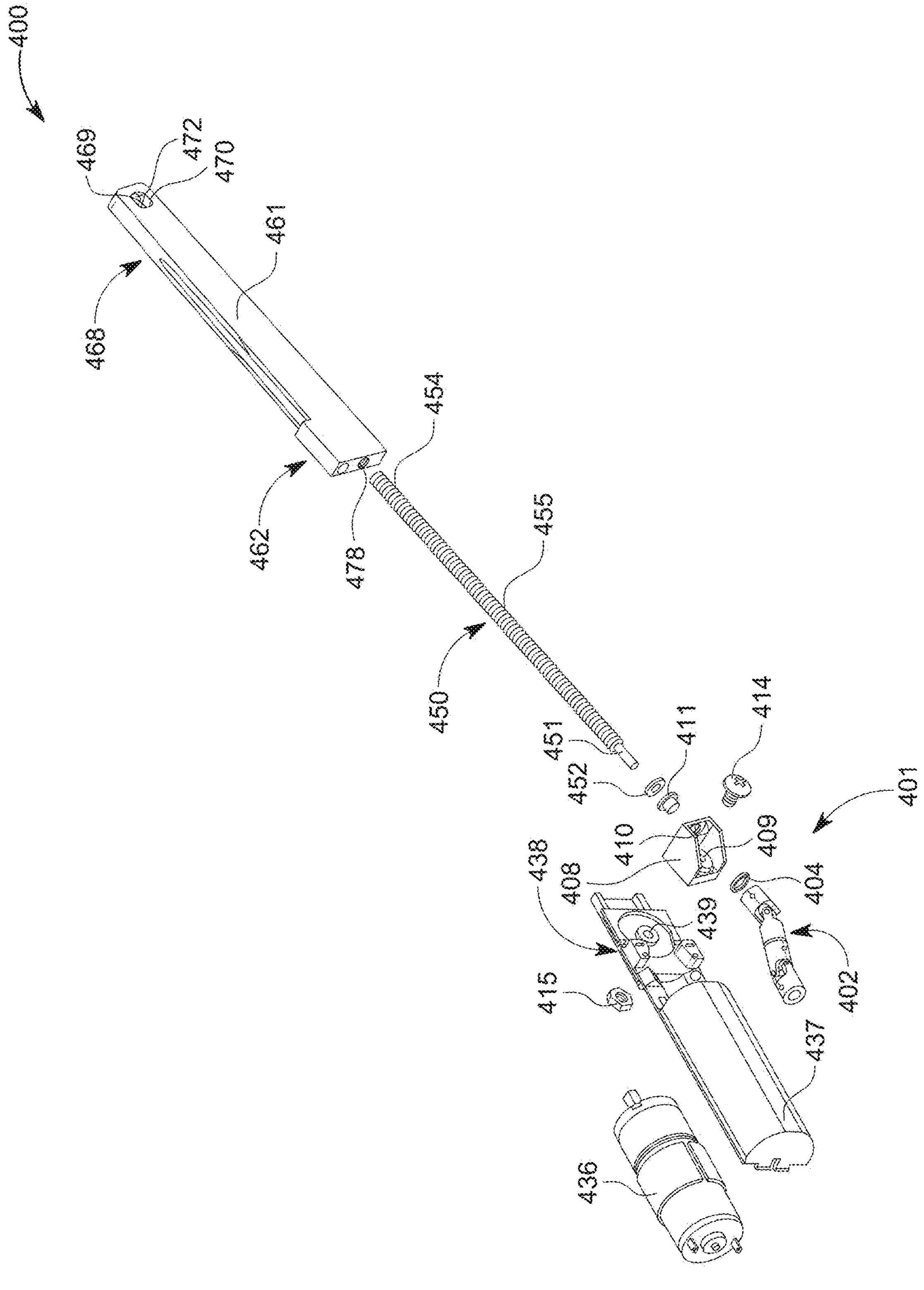
FIG. 15 is an exploded perspective view of the window operator shown in FIG. 14.
Figure 16:
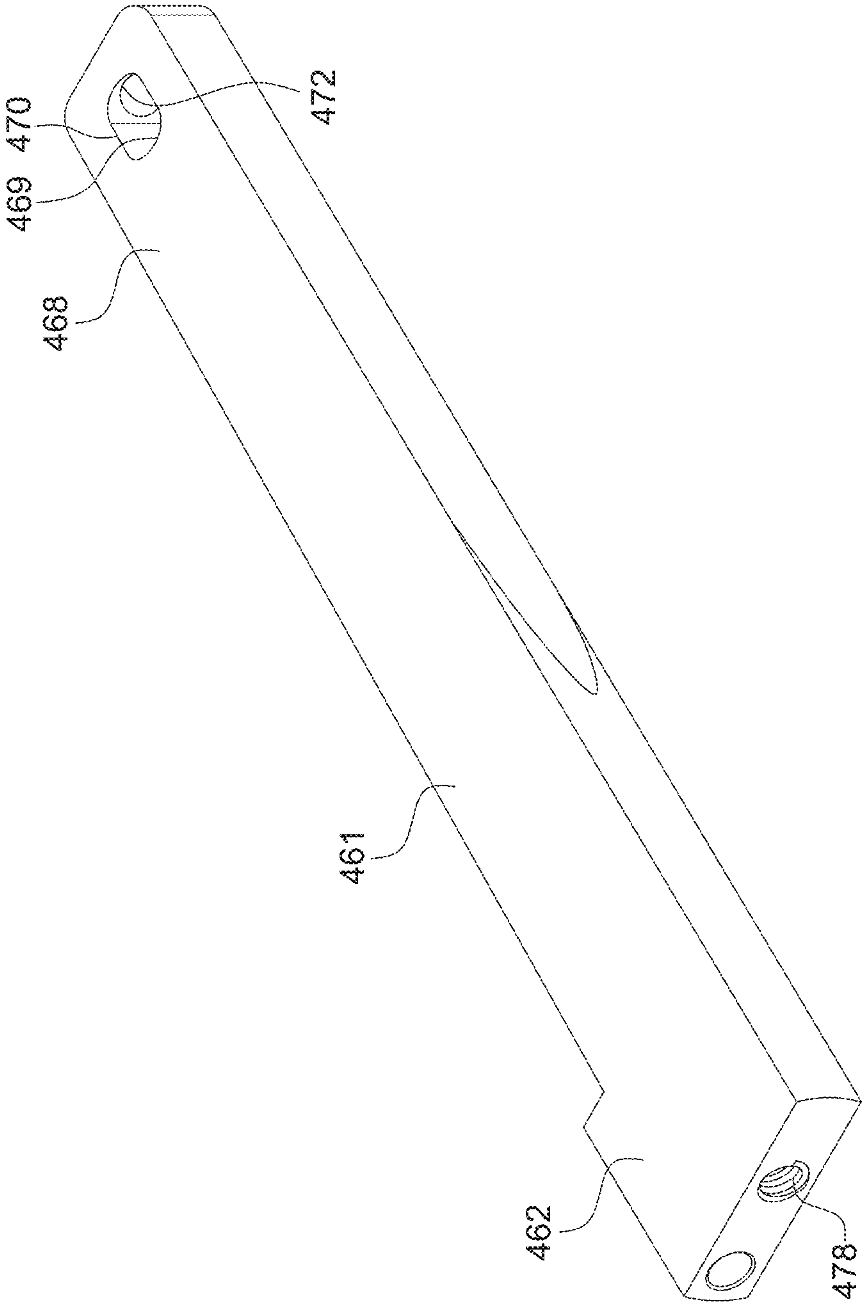
FIG. 16 is a perspective view of an elongated nut of the window operator shown in FIG. 14.
Figure 17:
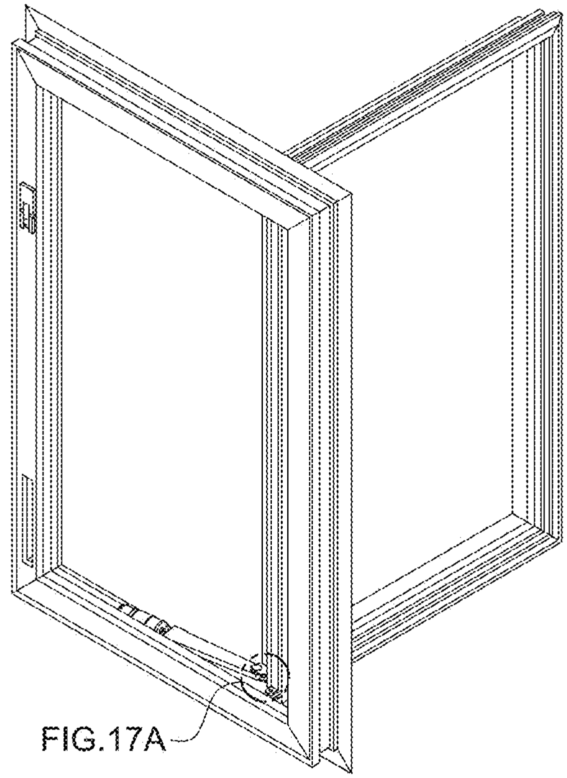
FIG. 17 is a perspective view of a window assembly illustrating a sash pivot of the window operator shown in FIG. 14.
Figure 17A:
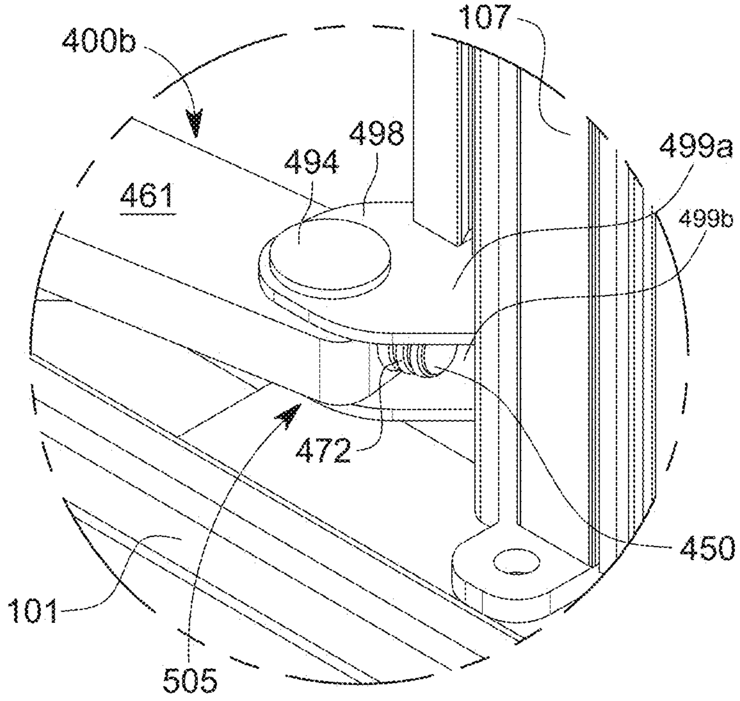
FIG. 17A is a perspective view of the sash pivot shown in FIG. 17.

The bracket assembly 401 is shown in FIGS. 14 and 15. The bracket assembly 401 includes a first connector 402 and a pivot bracket 408, which allow the leadscrew 450 to both pivot and rotate. The pivot bracket 408 is generally L-shaped with side gussets and includes a bottom aperture 409 and a side aperture 410. A fastener 414 extends through the bottom aperture 409 and the aperture 439 in the pivot extension 438 to secure these components to the window frame and allow the pivot bracket 408 to pivot relative to the pivot extension 438 and the window frame about the fastener 414. The first connector 402 is pivotally connected to the motor 436 and is pivotally connected to the first end 451 of the leadscrew 450, which extends through the side aperture 410. An example of a suitable first connector 402 is a double U-joint, which allows the motor 436 to be offset and mounted into the window frame, as shown in FIG. 13. A washer 404 is positioned between the first connector 402 and a first side of the pivot bracket 408 proximate aperture 410, and a washer 452 is positioned between a second side of the pivot bracket 408 proximate the aperture 410 and the start of the threads on the leadscrew 450. A bushing 411 may be used to help the leadscrew 450 rotate within the side aperture 410. Pins (not shown) are used to connect the first connector 402 to the motor 436 and the leadscrew 450. The intermediate portion 455 and the second end 454 of the leadscrew 450 extend outward from the bracket assembly 401 to engage the elongated nut **400*b***.

The elongated nut **400*b* includes a housing 461 with a first end 462 and a second end 468. A longitudinal bore 478, configured and arranged to receive the leadscrew 450, extends through the housing 461 from the first end 462 to the second end 468. The second end 468 includes a lateral extending, generally oval aperture 469 with flat sides 470. A bore 472 extends from the second end 468 into the aperture 469, and the bore 478 aligns with the bore 472**.

Figure 18:
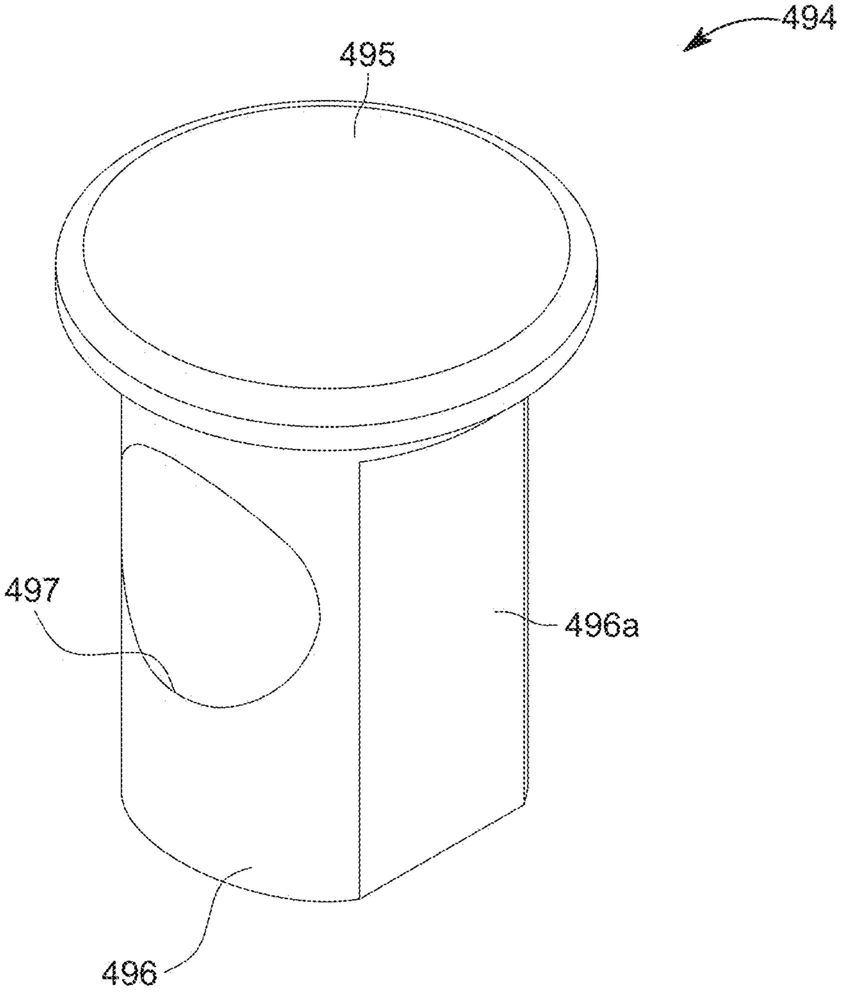
FIG. 18 is a perspective view of a pin of the sash pivot shown in FIG. 17.

The aperture 469 is configured and arranged to receive a pin 494. As shown in FIG. 18, the pin 494 includes a head 495 from which a shaft 496 extends. The shaft 496 includes opposing flat sides **496*a* corresponding with the flat sides 470 of the elongated nut's aperture 469, so that the pin 494 cannot rotate or pivot within the aperture 469, and a bore 497 corresponding with the bores 472 and 478, which create a channel through which the leadscrew 450 may extend as the elongated nut housing 461 moves along the leadscrew 450. This allows the window operator assembly to fit in smaller windows and also allow various hinge configurations as it has more travel length than it would otherwise. The pin 494 interconnects a bracket 498 connected to the sash 107 and the second end 468 of the elongated nut 400*b* to provide a sash pivot 505. Preferably, the bracket 498 includes two plate portions 499*a* and 499*b* between which the housing 461 is positioned, and the pin 494 and the housing 461** pivot together within the bracket's apertures.

Figure 9:
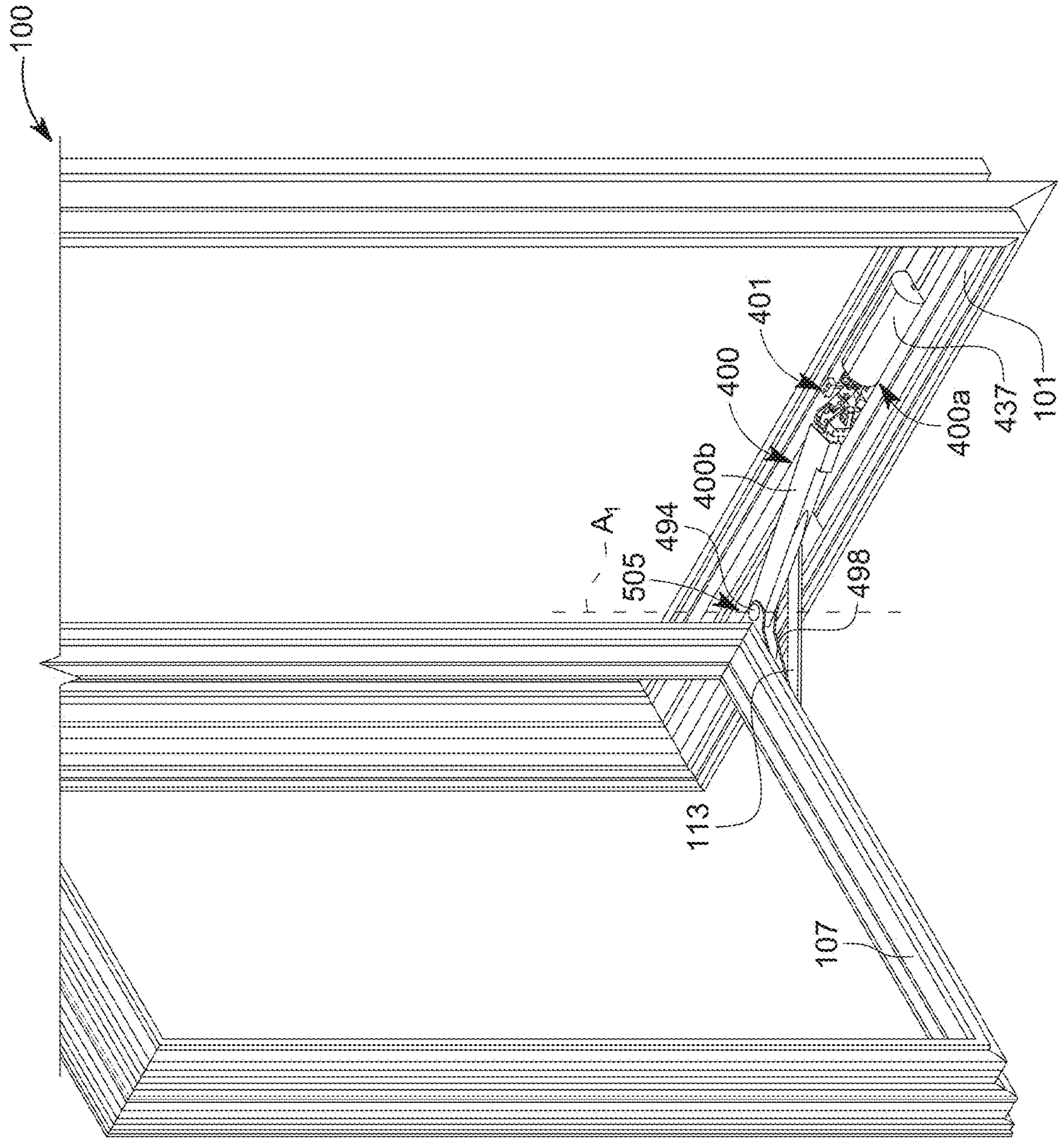
FIG. 9 is a perspective view of another embodiment window operator connected to a window in a first open position and constructed in accordance with the principles of the present invention.
Figure 10:
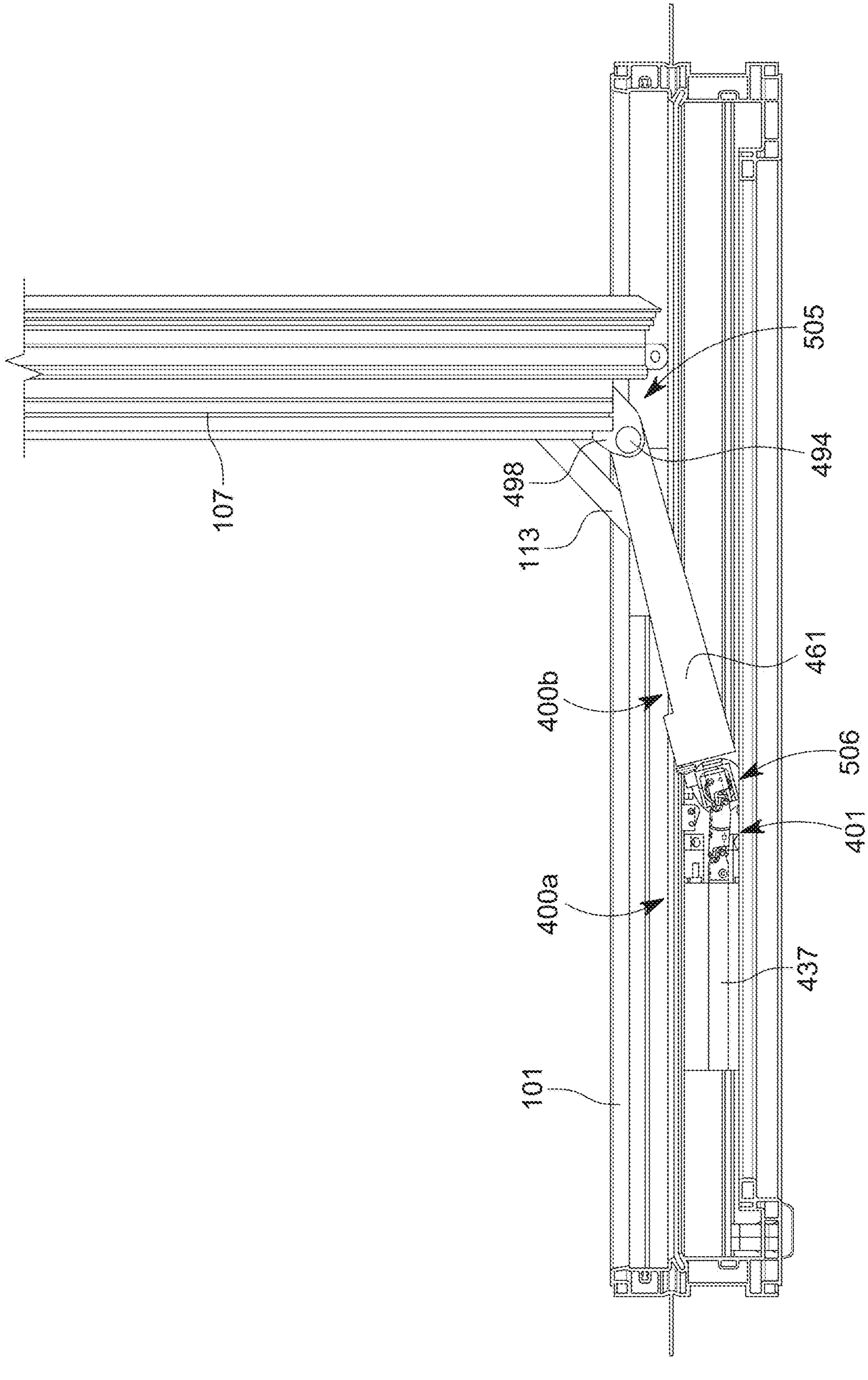
FIG. 10 is a top view of the window operator and window shown in FIG. 9 with the window's top and side frame members removed.
Figure 11:
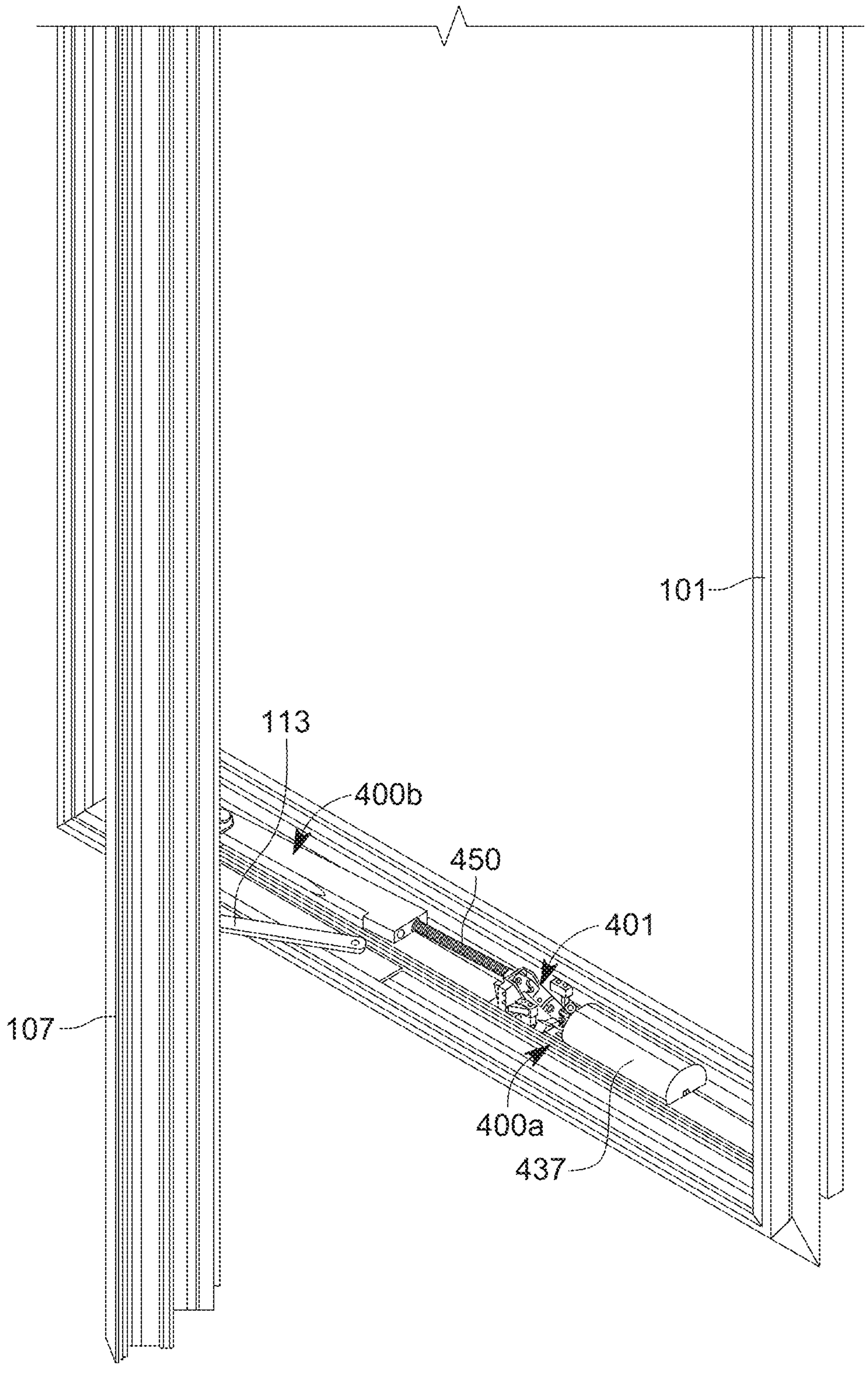
FIG. 11 is a perspective view of the window operator and window shown in FIG. 9 in a second open position.
Figure 12:
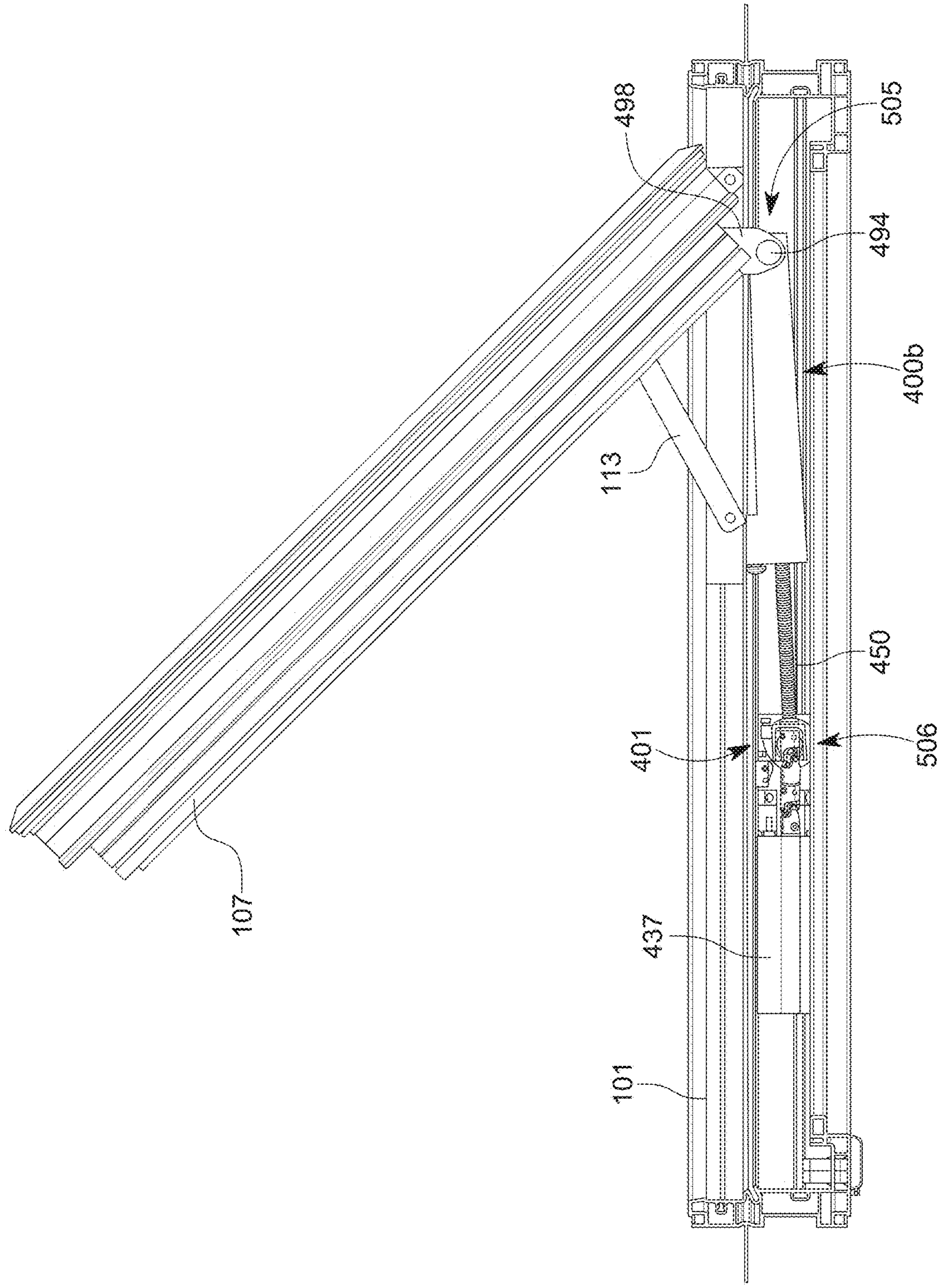
FIG. 12 is a top view of the window operator and window shown in FIG. 11 with the window's top and side frame members removed.

In use, when the leadscrew 450 rotates, by a motor 436 or other rotating member, the elongated nut housing 461 moves along the leadscrew 450, causing the leadscrew 450 to pivot about the frame pivot 506 and causing the elongated nut housing 461 to pivot about the sash pivot 505. As shown in FIGS. 9-12, as the elongated nut housing 461 moves along the leadscrew 450 toward the motor 450, the distance between the sash pivot 505 and the frame pivot 506 shortens and the sash 107 opens more fully, and as the elongated nut housing 461 moves away from the motor 450, the distance between the sash pivot 505 and the frame pivot 506 lengthens and the sash 107 moves toward its closed position. The bracket assembly 401 allows the leadscrew 450 to both rotate and pivot relative to the window frame. In this embodiment, because the hinge 113 controls the path of the sash 107 with respect to the frame 101, and the window operator assembly 400 positions the sash 107 along the path by changing the distance between a sash pivot and a frame pivot, a pivot axis of the sash 107 moves relative to the window frame 101 as the sash 107 moves with the elongated nut **400*b* relative to the window frame 101. Thus, in this embodiment, the pivot axis A1 includes at least a first pivot axis about pin 494, as illustrated in FIG. 9**.

Another embodiment window operator assembly 600, illustrated in FIGS. 19-22, may be used with a window such as window 100. The window operator assembly 600 is similar to the window operator assemblies 200 and 400, therefore, only the significant differences are being described. It is recognized that the differing components and features may be interchanged among the embodiments.

The window operator assembly 600 includes an operator **600*a* and an elongated nut 600*b*. The operator 600*a* includes a bracket 601 interconnecting the motor 636 and the frame 101 that allows the operator 600*a*, including the leadscrew 650 to rotate and pivot relative to the frame 101 at a frame pivot 706**.

Figure 21:
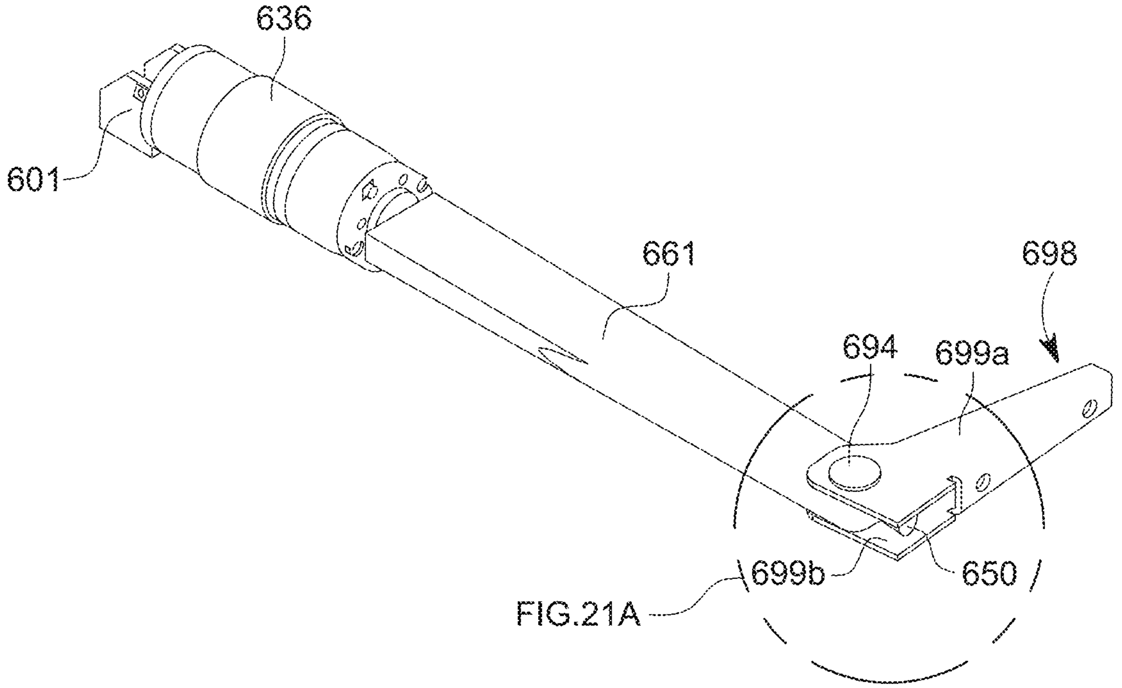
FIG. 21 is a perspective view of the window operator shown in FIG. 19 illustrating a sash pivot.
Figure 21A:
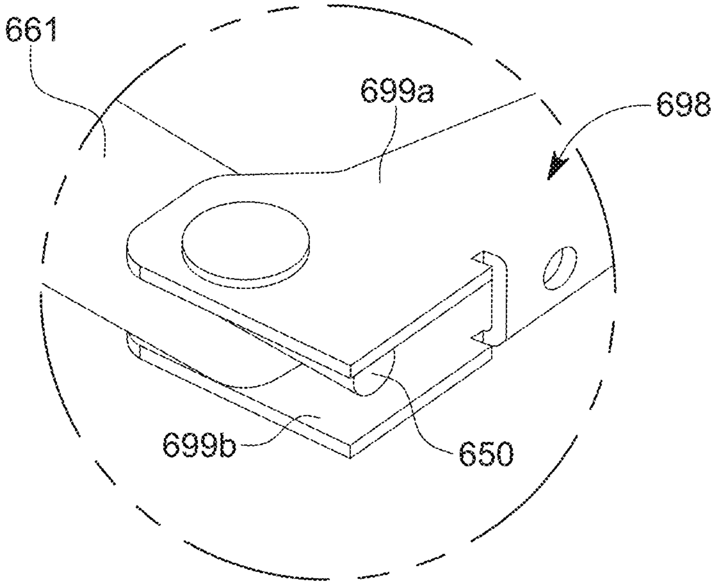
FIG. 21A is a perspective view of the sash pivot shown in FIG. 21.
Figure 22:
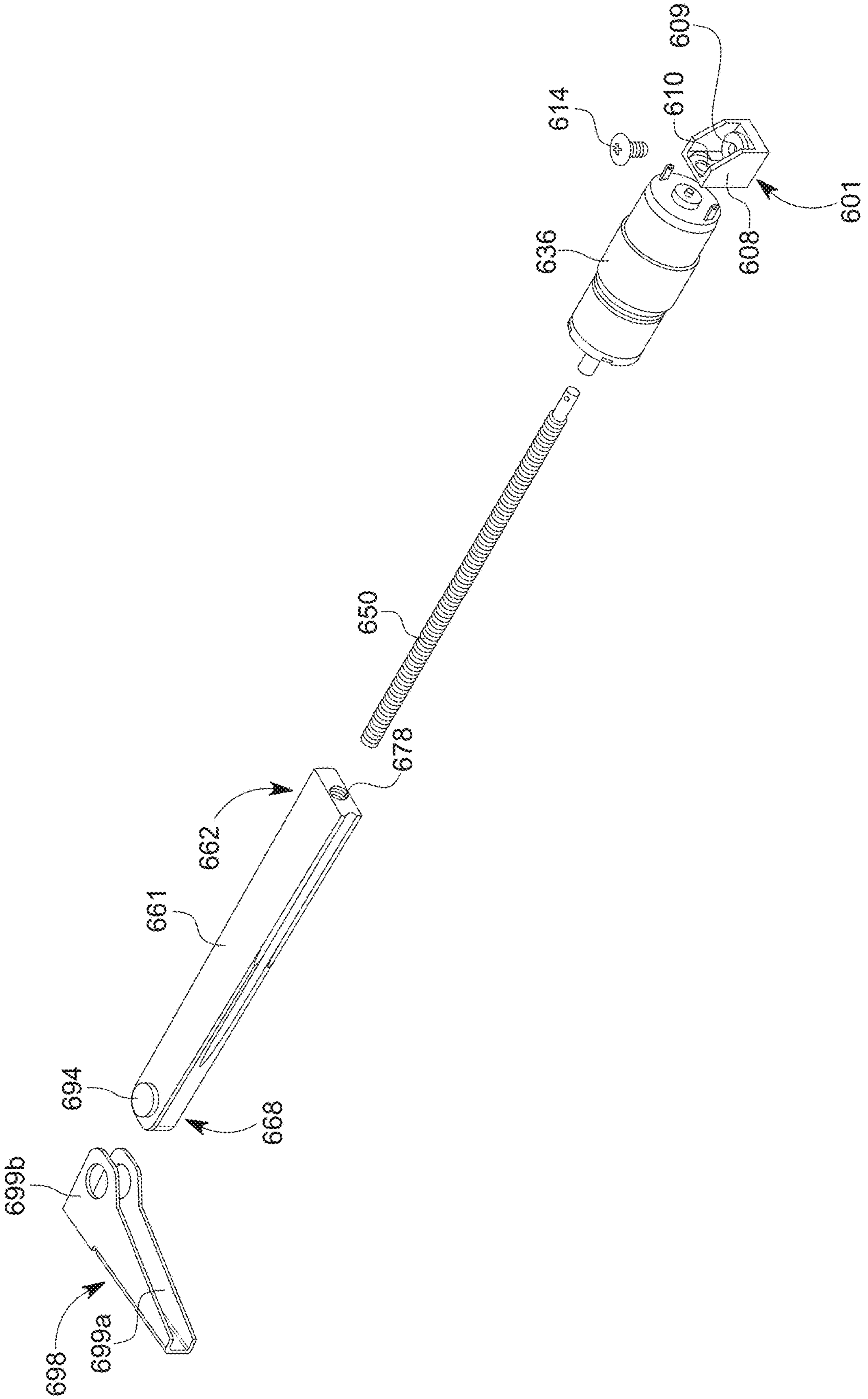
FIG. 22 is an exploded perspective view of the window operator shown in FIG. 19.
Figure 23:
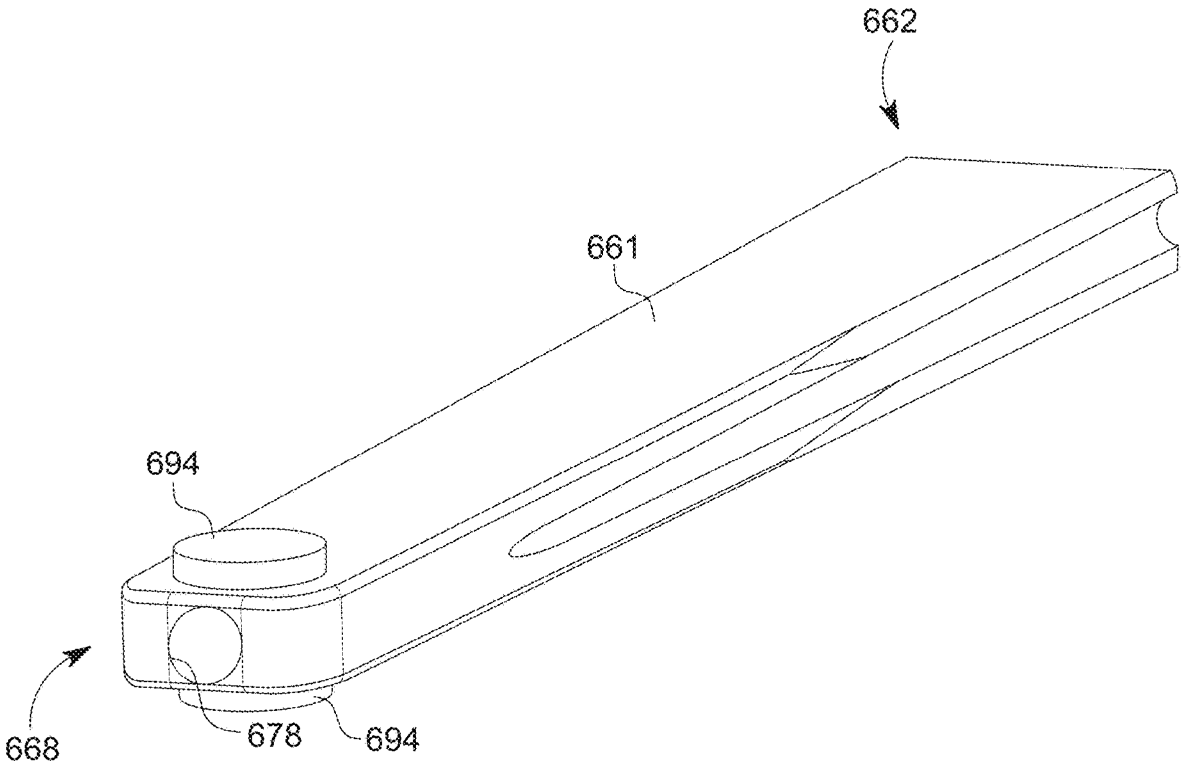
FIG. 23 is a perspective view of an elongated nut of the window operator shown in FIG. 20.

The bracket assembly 601, shown in FIGS. 21 and 22, includes a pivot bracket 608 that is generally L-shaped with side gussets and includes a bottom aperture 609 and a side aperture 610. A fastener 614 extends through the bottom aperture 609 to pivotally connect the pivot bracket 608 to the window frame, and a fastener (not shown) extends through the side aperture 610 to connect the motor 636 to the pivot bracket 608. As the pivot bracket 608 pivots about the fastener 614, the motor 636 and the leadscrew 650 also pivot.

The elongated nut 600*b* includes a housing 661 with a first end 662 and a second end 668. A longitudinal bore 678, configured and arranged to receive the leadscrew 650, extends through the housing 661 from the first end 662 to the second end 668. The second end 668 includes lateral extending protrusions 694 configured and arranged to fit within aperture(s) of a bracket 698. Preferably, the bracket 698 includes two plate portions 699*a* and 699*b* between which the housing 661 is positioned, and the housing 661 pivots about the protrusions 694 within the bracket's apertures at a sash pivot 705.

Figure 19:
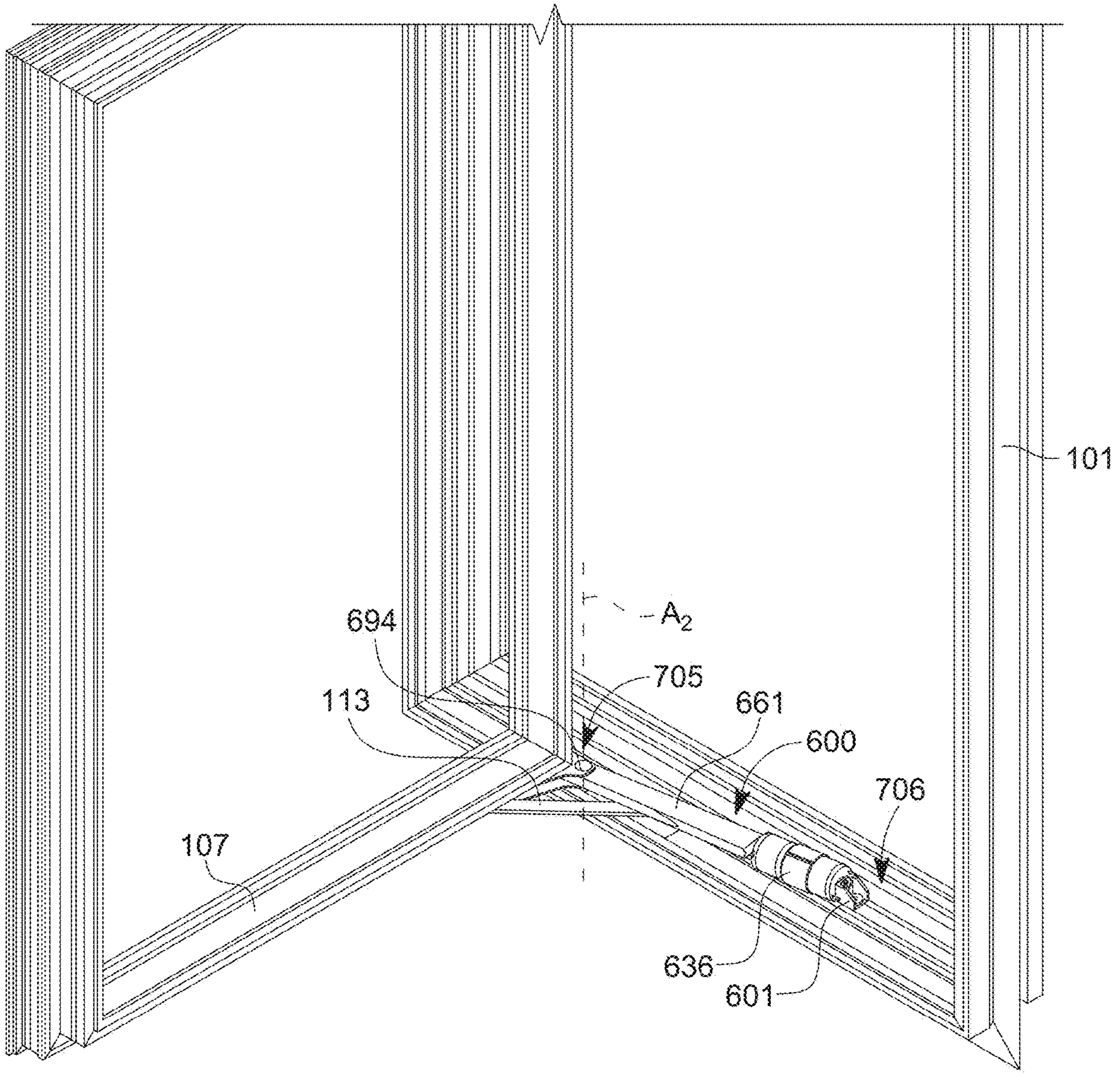
FIG. 19 is a perspective view of another embodiment window operator connected to a window in a first open position and constructed in accordance with the principles of the present invention.
Figure 20:
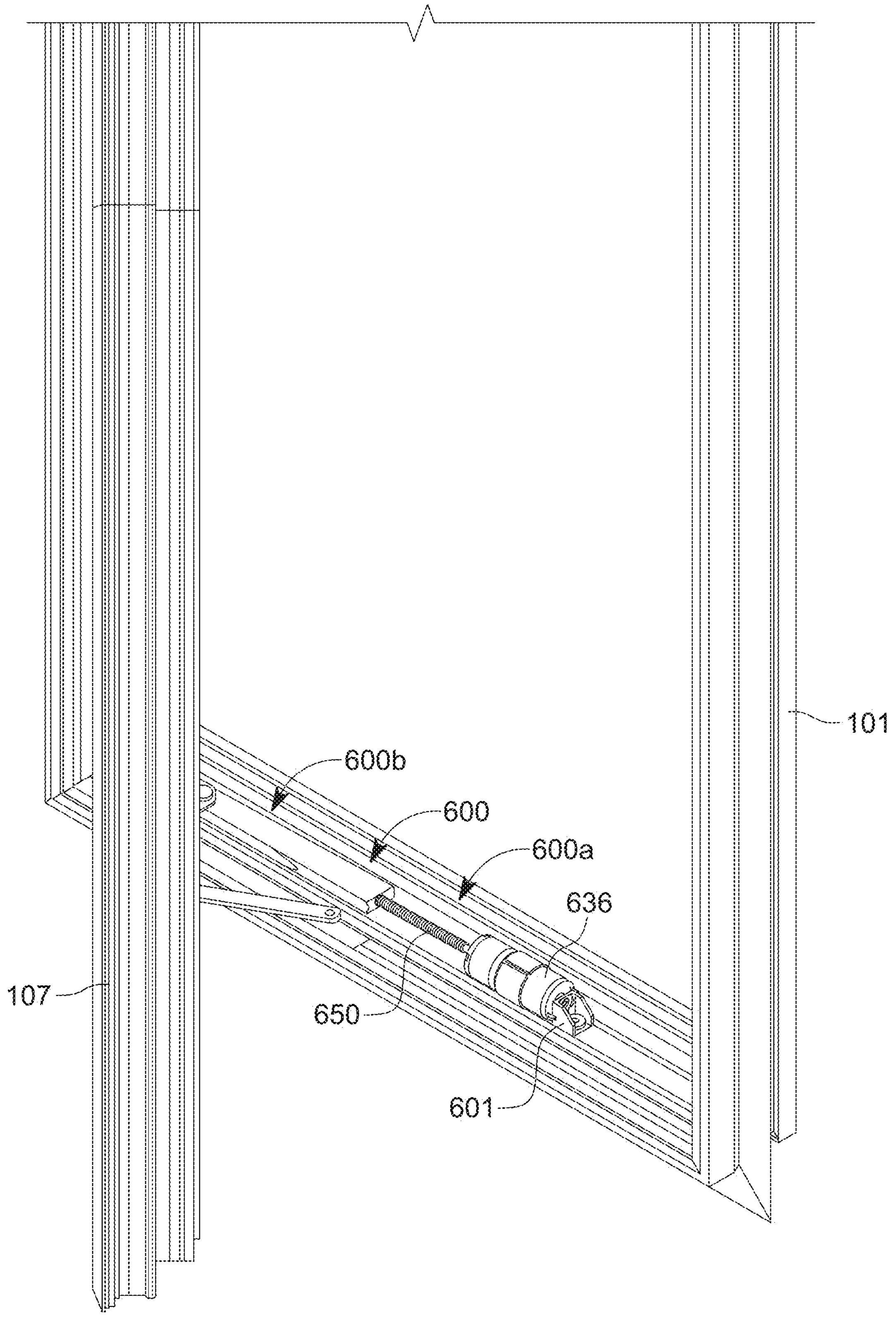
FIG. 20 is a is a perspective view of the window operator and window shown in FIG. 19 in a second open position.

In use, when the leadscrew rotates, by a motor 636 or other rotating member, the elongated nut housing 661 moves along the leadscrew 650, causing the motor 636 and the leadscrew 650 to pivot about the frame pivot 706 and causing the elongated nut housing 661 to pivot about the sash pivot 705. As shown in FIGS. 19-22, as the elongated nut housing 661 moves along the leadscrew 650 toward the motor 650, the distance between the sash pivot 505 and the frame pivot 506 shortens and the sash 107 opens more fully, and as the elongated nut housing 661 moves away from the motor 650, the distance between the sash pivot 505 and the frame pivot 506 lengthens and the sash 107 moves toward its closed position. In this embodiment, because the hinge 113 controls the path of the sash 107 with respect to the frame 101, and the window operator assembly 600 positions the sash 107 along the path by changing the distance between a sash pivot and a frame pivot, a pivot axis A2 of the sash 107 moves relative to the window frame 101 as the sash 107 moves with the elongated nut 600*b* relative to the window frame 101. Thus, in this embodiment, the pivot axis includes at least a first pivot axis about protrusion 694, as illustrated in FIG. 19.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A window operator assembly for moving a window sash between an open position and a closed position relative to a window frame, the window sash having a top sash member operatively connected to a bottom sash member by a first side sash member and a second side sash member, the window frame having a top frame member operatively connected to a bottom frame member by a first side frame member and a second side frame member, the window operator assembly comprising:

a leadscrew pivotally operatively mounted to the window frame via a frame pivot and rotatable relative to the window frame; and an elongated nut pivotally mounted to the window sash via a sash pivot, wherein as the leadscrew rotates in a first direction, the elongated nut moves in a first direction along the leadscrew and moves the window sash toward the open position relative to the window frame, and as the leadscrew rotates in a second direction, the elongated nut moves in a second direction along the leadscrew and moves the window sash toward the closed position relative to the window frame, wherein the leadscrew and the elongated nut interconnect the window frame and the window sash and the window sash partially pivots relative to the window frame about the sash pivot, and the sash pivot moves relative to the window frame as the window sash moves with the elongated nut relative to the window frame.

2. The window operator assembly of claim 1, further comprising a motor connected to the leadscrew for rotating the leadscrew.

3. The window operator assembly of claim 2, wherein the motor is contained within a housing pivotally mounted to the window frame.

4. The window operator assembly of claim 2, further comprising a housing configured and arranged to contain the motor, at least a portion of the leadscrew, and at least a portion of the elongated nut, the housing including the frame pivot.

5. The window operator assembly of claim 4, wherein the frame pivot includes a receiver and a fastener configured and arranged to extend outward from one of either of opposing sides of the housing thereby allowing for connection of the housing to the window frame and for connection of the sash pivot to the window sash to open the window sash relative to either the first or second side frame member.

6. The window operator assembly of claim 4, wherein the housing and the elongated nut including mating features such that the elongated nut cannot rotate relative to the housing.

7. The window operator assembly of claim 6, wherein when the elongated nut moves along the leadscrew when the motor rotates the leadscrew, a distance between the sash pivot and the frame pivot changes, and a distance the elongated nut extends into the housing changes.

8. The window operator assembly of claim 1, further comprising an elongated nut bore extending through the elongated nut from a proximal end to a distal end of the elongated nut, wherein the elongated nut moves along the leadscrew and changes a distance between the sash pivot and the frame pivot, and the elongated nut is configured and arranged to allow the leadscrew to extend through the elongated nut bore and out the distal end.

9. The window operator assembly of claim 1, wherein the leadscrew and the elongated nut are configured and arranged to allow for pivotal connection of the elongated nut proximate one of the top sash member, the bottom sash member, the first side sash member, or the second side sash member.

10. The window operator assembly of claim 1, wherein the frame pivot and the sash pivot are in line with the leadscrew and the elongated nut.

11. The window operator assembly of claim 1, further comprising a hinge member interconnecting the window sash and the window frame, the hinge member partially controlling a path of movement of the window sash relative to the window frame.

12. A window operator assembly for moving a window sash between an open position and a closed position relative to a window frame, the window sash having a top sash member operatively connected to a bottom sash member by a first side sash member and a second side sash member, the window frame having a top frame member operatively connected to a bottom frame member by a first side frame member and a second side frame member, the window operator assembly comprising:

a leadscrew having a first leadscrew end and a second leadscrew end;

a motor operatively connected to the first leadscrew end and configured and arranged to rotate the leadscrew;

a first pivot configured and arranged to pivotally mount the leadscrew to the window frame;

an elongated nut having a first nut end, a second nut end, and a bore extending longitudinally through the elongated nut, the bore configured and arranged to receive at least a portion of the leadscrew, the elongated nut being configured and arranged to move along the leadscrew when the leadscrew is rotated by the motor; and a second pivot configured and arranged to pivotally mount the elongated nut to the window sash, wherein the leadscrew and the elongated nut interconnect the window frame and the window sash and the window sash partiallu pivots relative to the window frame about the second pivot, and the second pivot moves relative to the window frame as the window sash moves with the elongated nut relative to the window frame.

13. The window operator assembly of claim 12, wherein the leadscrew and the elongated nut are configured and arranged to allow for pivotal connection of the elongated nut proximate one of the top sash member, the bottom sash member, the first side sash member, or the second side sash member.

14. The window operator assembly of claim 12, further comprising a housing configured and arranged to contain the motor, at least a portion of the leadscrew, and at least a portion of the elongated nut, the housing including the first pivot.

15. The window operator assembly of claim 14, wherein the first pivot includes a receiver and a fastener configured and arranged to extend outward from one of either of opposing sides of the housing thereby allowing for connection of the housing to the window frame and for connection of the second pivot to the window sash to open the window sash relative to either the first or second side frame member.

16. The window operator assembly of claim 14, wherein when the elongated nut moves along the leadscrew, a distance between the second pivot and the first pivot changes, and a distance the elongated nut extends into the housing changes.

17. The window operator assembly of claim 12, further comprising a hinge member interconnecting the window sash and the window frame, the hinge member partially controlling a path of movement of the window sash relative to the window frame.

18. An operator for moving a window sash between a closed position and an open position relative to a window frame, comprising:

a leadscrew having a first leadscrew end and a second leadscrew end;

a rotating member operatively connected to the first leadscrew end and configured and arranged to rotate the leadscrew;

a first pivot configured and arranged to pivotally mount the leadscrew to the window frame;

an elongated nut having a first nut end, a second nut end, and a bore extending longitudinally through the elongated nut, the bore configured and arranged to receive at least a portion of the leadscrew, the elongated nut being configured and arranged to move along the leadscrew when the leadscrew is rotated by the rotating member; and a second pivot configured and arranged pivotally mount the elongated nut to the window sash, wherein the leadscrew and the elongated nut interconnect the window frame and the window sash and the window sash partially pivots relative to the window frame about the second pivot, and the second pivot moves relative to the window frame as the window sash moves with the elongated nut relative to the window frame, wherein a distance between the first pivot and the second pivot shortens to position the window sash in the open position relative to the window frame and the distance between the first pivot and the second pivot lengthens to position the window sash in the closed position relative to the window frame.

19. The operator of claim 18, wherein the rotating member is a motor.

* * * * *